United States Patent
Woodard et al.

(10) Patent No.: US 12,100,131 B2
(45) Date of Patent: Sep. 24, 2024

(54) KNOWLEDGE-BASED OBJECT LOCALIZATION IN IMAGES FOR HARDWARE ASSURANCE

(71) Applicant: University of Florida Research Foundation, Incorporated, Gainesville, FL (US)

(72) Inventors: Damon Woodard, Newberry, FL (US); Mark M. Tehranipoor, Gainesville, FL (US); Navid Asadi-Zanjani, Gainesville, FL (US); Ronald Wilson, Gainesville, FL (US); Hangwei Lu, Gainesville, FL (US); Nidish Vashistha, Gainesville, FL (US)

(73) Assignee: University of Florida Research Foundation, Incorporated, Gainesville, FL (US)

( * ) Notice: Subject to any disclaimer, the term of this patent is extended or adjusted under 35 U.S.C. 154(b) by 327 days.

(21) Appl. No.: 17/491,150

(22) Filed: Sep. 30, 2021

(65) Prior Publication Data

US 2022/0130031 A1   Apr. 28, 2022

Related U.S. Application Data

(60) Provisional application No. 63/105,392, filed on Oct. 26, 2020.

(51) Int. Cl.
*G06T 7/73* (2017.01)
*G06F 18/22* (2023.01)
(Continued)

(52) U.S. Cl.
CPC ............ *G06T 7/0006* (2013.01); *G06F 18/22* (2023.01); *G06F 18/23213* (2023.01);
(Continued)

(58) Field of Classification Search
CPC ......... G06T 7/0006; G06T 5/002; G06T 7/70; G06T 9/00; G06T 2207/10061;
(Continued)

(56) References Cited

U.S. PATENT DOCUMENTS

| 2009/0232405 A1* | 9/2009 | Taguchi ............... G06V 10/754 382/218 |
| 2017/0191945 A1* | 7/2017 | Zhang ................... G06T 3/4053 |

(Continued)

OTHER PUBLICATIONS

Tarhio, Jorma. "A Boyer-Moore Approach for Two-Dimensional Matching," Dec. 1993, (13 pages), University of California, Berkeley, Computer Science Division, Berkeley, California, Available online: http://www2.eecs.berkeley.edu/Pubs/TechRpts/1993/CSD-93-784.pdf.

*Primary Examiner* — Amandeep Saini
*Assistant Examiner* — Mehrazul Islam
(74) *Attorney, Agent, or Firm* — ALSTON & BIRD LLP

(57) ABSTRACT

Embodiments of the present disclosure provide methods, apparatus, systems, and computer program products for using an image of an integrated circuit (IC) including a plurality of cells to locate one or more target cells within the IC. Accordingly, in various embodiments, a footprint for each cell of the plurality of cells is encoded to transform the image of the IC into a two-dimensional string matrix. A string search algorithm is then applied on each encoded dopant region found in the two-dimensional string matrix using an encoded target layout cell to identify one or more candidate regions of interest within the image. Finally, a mask window is slid over each candidate region of interest while performing matching using match criteria to identify any target cells in the one or more target cells that are located within the candidate region of interest.

18 Claims, 19 Drawing Sheets

(51) Int. Cl.
  *G06F 18/23213* (2023.01)
  *G06T 5/70* (2024.01)
  *G06T 7/00* (2017.01)
  *G06T 7/11* (2017.01)
  *G06T 7/55* (2017.01)
  *G06T 7/70* (2017.01)
  *G06T 9/00* (2006.01)
  *G06V 10/25* (2022.01)
  *G06V 20/69* (2022.01)
  *G06V 10/75* (2022.01)

(52) U.S. Cl.
  CPC .................. *G06T 5/70* (2024.01); *G06T 7/70* (2017.01); *G06T 9/00* (2013.01); *G06V 10/25* (2022.01); *G06V 20/698* (2022.01); *G06T 2207/10061* (2013.01); *G06T 2207/20224* (2013.01); *G06T 2207/30148* (2013.01); *G06V 10/759* (2022.01); *G06V 2201/07* (2022.01)

(58) Field of Classification Search
  CPC . G06T 2207/20224; G06T 2207/30148; G06T 2207/20028; G06T 7/11; G06T 7/136; G06F 18/22; G06F 18/23213; G06V 10/25; G06V 20/698; G06V 10/759; G06V 2201/07; G06V 10/467; G06V 10/751
  See application file for complete search history.

(56) References Cited

U.S. PATENT DOCUMENTS

2018/0247896 A1\* 8/2018 Meyer ................... H01L 23/544
2019/0346769 A1\* 11/2019 Hashimoto ............ G01B 15/04
2022/0351359 A1\* 11/2022 Zhang ................ G03F 7/70616

\* cited by examiner

KNOWLEDGE-BASED OBJECT LOCALIZATION IN IMAGES FOR HARDWARE ASSURANCE

CROSS REFERENCE PARAGRAPH

This application claims the benefit of U.S. Provisional Application No. 63/105,392 filed Oct. 26, 2020, which is incorporated herein by reference in its entirety, including any figures, tables, drawings, and appendices.

TECHNICAL FIELD

The present application relates to object localization in the semiconductor domain, and more particularly, incorporating layout information to detect multiple standard cells in an image such as a scanning electron microscopy (SEM) image.

BACKGROUND

Object localization involves identifying regions of interest (ROIs) containing target objects that are similar to a template. Object localization allows for more efficient image processing since the image area outside of ROIs are not often processed in further steps, such as feature extraction or classification. However, object localization is often one of the more challenging steps in solving vision tasks.

Various processes for object localization have been developed for applications using optical images. However, optical images cannot always be used in certain research fields. For example, in hardware assurance, the selection of image modalities depends on aspects of the objects under inspection from size, material, location, or structure, where images taken by non-optical modalities may carry properties different from optical images, thus limiting the performance of existing processing.

For example, scanning electron microscopy (SEM) image-based visual inspection of integrated circuits (ICs) provides detailed, rich information to support research in the hardware assurance domain and the development of related applications. However, such a visual inspection often suffers from scaling problems when particular cells are required to be located for analysis such as, for example, the on-chip reference cells used for training a machine learning classifier to detect hardware Trojans. First, today's ICs typically include millions of condensed standard cells, making it extremely difficult to find desired cells manually. Second, SEM images that include detailed features are typically much smaller than an area covering the entire IC, thus making it challenging to navigate the location of the captured SEM image area from the entire SEM image of an IC. This can cause difficulties when a comparison between the design file (e.g., a layout image) and the SEM image is required. Some existing approaches use vias, contacts, and corners of metal layer polygons as points of interest for matching. However, corners of polygons are not available in SEM images due to process variations. Due at least to this absence of points of interest as well as imaging errors that accumulate through deprocessing multiple layers, existing approaches remain inadequate for automatically locating target cells at least in SEM image applications.

Therefore, a need exists in the art for an approach that can automatically locate cells and navigate an image view to improve physical analysis efficiency. It is with respect to these considers and other that the disclosure herein is presented.

BRIEF SUMMARY

In general, embodiments of the present disclosure provide methods, apparatus, systems, computer program products, computing devices, computing entities, and/or the like for using an image of an integrated circuit (IC) including a plurality of cells to locate one or more target cells within the IC. For instance, the image may be a SEM image of the IC. Accordingly, in various embodiments, a footprint for each cell of the plurality of cells found in the image is encoded to transform the image of the IC into a two-dimensional string matrix. A string search algorithm is then applied on the two-dimensional string matrix using an encoded target layout cell to identify one or more candidate regions of interest within the image. Finally, a mask window is slid over each candidate region of interest while performing matching using match criteria to identify any target cells in the one or more target cells that are located within the candidate region of interest.

In some embodiments, encoding the footprint for each cell of the plurality of cells involves performing k-means clustering using width and height features of each dopant found in the footprint. While in some embodiments, the subtraction criteria comprises image subtraction. Furthermore, in some embodiments, preprocessing may be carried out on the image prior to encoding the footprint for each cell of the plurality of cells. For instance, the preprocessing of the image may involve aligning the mask window with the image, removing noise from the image, binarizing the image, and/or removing voltage lines and/or ground lines from the image. For example, removing the noise from the image may involve applying a Gaussian filter and then applying a bilateral filter. While in another example, binarizing the image may involve applying Otsu thresholding to the image.

According to one aspect of the present disclosure, a computer-implemented method for using an image of an integrated circuit (IC) including a plurality of cells to locate one or more target cells within the IC is provided. The computer-implemented method includes encoding a footprint for each cell of the plurality of cells found in the image of the IC to transform the image of the IC into a two-dimensional string matrix. The computer-implemented method further includes identifying one or more candidate regions of interest within the image of the IC based at least in part on applying a string search algorithm on the two-dimensional string matrix using an encoded target layout cell. The computer-implemented method further includes, for each candidate region of interest, identifying at least one target cell of the one or more target cells that is located with the candidate region of interest based at least in part on sliding a mask window over the candidate region of interest while performing matching using match criteria.

According to another aspect of the present disclosure, an apparatus configured for using an image of an integrated circuit (IC) including a plurality of cells to locate one or more target cells within the IC is provided. The apparatus includes at least one memory and at least one processor, the at least one memory including computer program code. The at least one memory and the computer program code are configured to cause the at least one processor to encode a footprint for each cell of the plurality of cells found in the image of the IC to transform the image of the IC into a two-dimensional string matrix. The at least one memory and the computer program code are further configured to cause the at least one processor to identify one or more candidate regions of interest within the image of the IC based at least in part on applying a string search algorithm on the two-dimensional string matrix using an encoded target layout cell. The at least one memory and the computer program code are further configured to cause the at least one processor to, for each candidate region of interest, identify at least one target cell of the one or more target cells that is located with the candidate region of interest based at least in part on sliding a mask window over the candidate region of interest while performing matching using match criteria According to yet another aspect of the present disclosure, a computer program product for using an image of an integrated circuit (IC) including a plurality of cells to locate one or more target cells within the IC is provided. The computer program product includes at least one computer-readable storage medium having computer-readable program code portions stored therein. The computer-readable program code portions include executable portions configured to cause a processor to encode a footprint for each cell of the plurality of cells found in the image of the IC to transform the image of the IC into a two-dimensional string matrix. The executable portions are further configured to cause a processor to identify one or more candidate regions of interest within the image of the IC based at least in part on applying a string search algorithm on the two-dimensional string matrix using an encoded target layout cell. The executable portions are further configured to cause a processor to, for each candidate region of interest, identify at least one target cell of the one or more target cells that is located with the candidate region of interest based at least in part on sliding a mask window over the candidate region of interest while performing matching using match criteria.

BRIEF DESCRIPTION OF THE SEVERAL VIEWS OF THE DRAWING(S)

Having thus described embodiments of the present disclosure in general terms, reference will now be made to the accompanying drawings, which are not necessarily drawn to scale, and wherein:

Figure 3A:
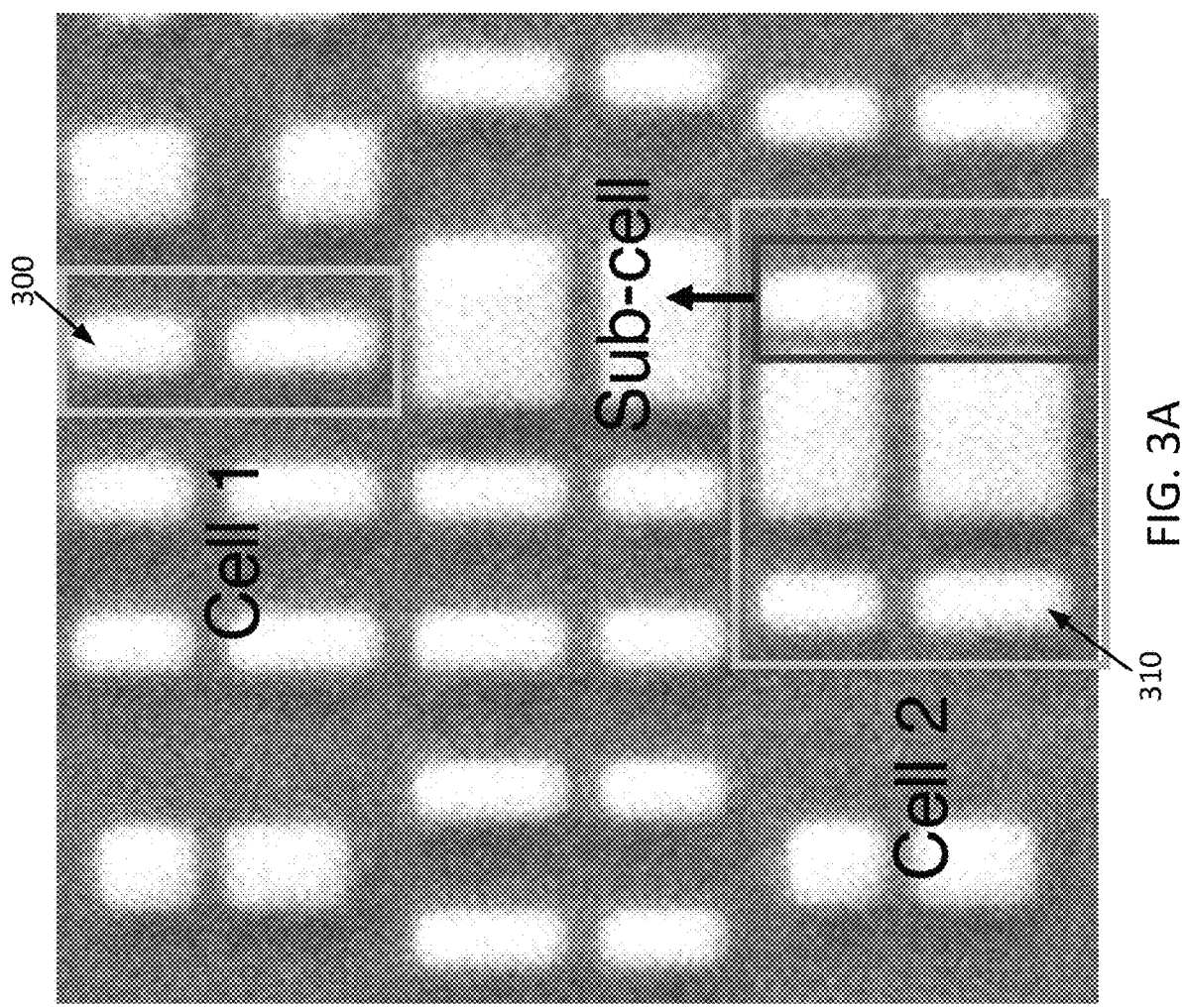
Figure 3B:
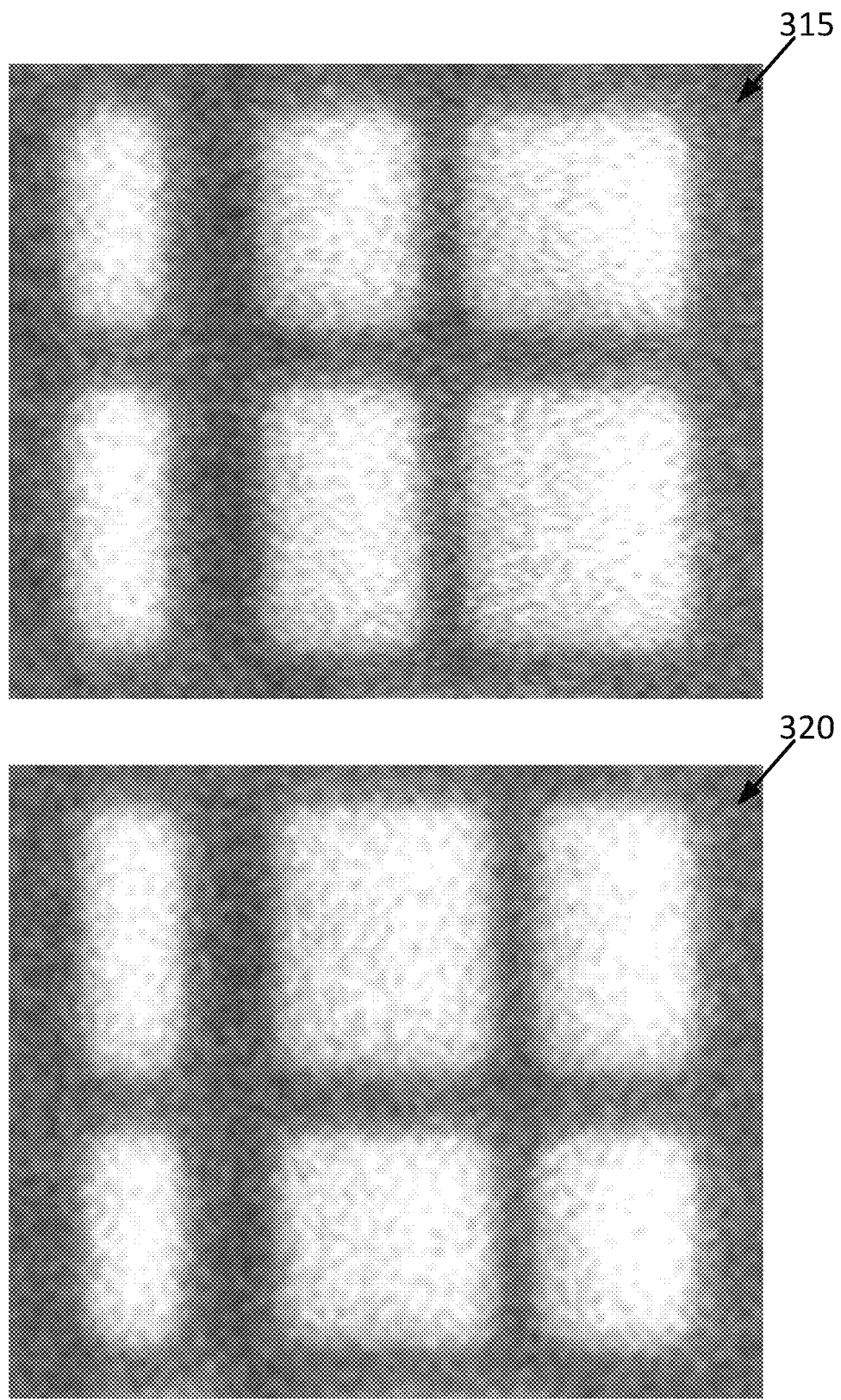
Figure 4:
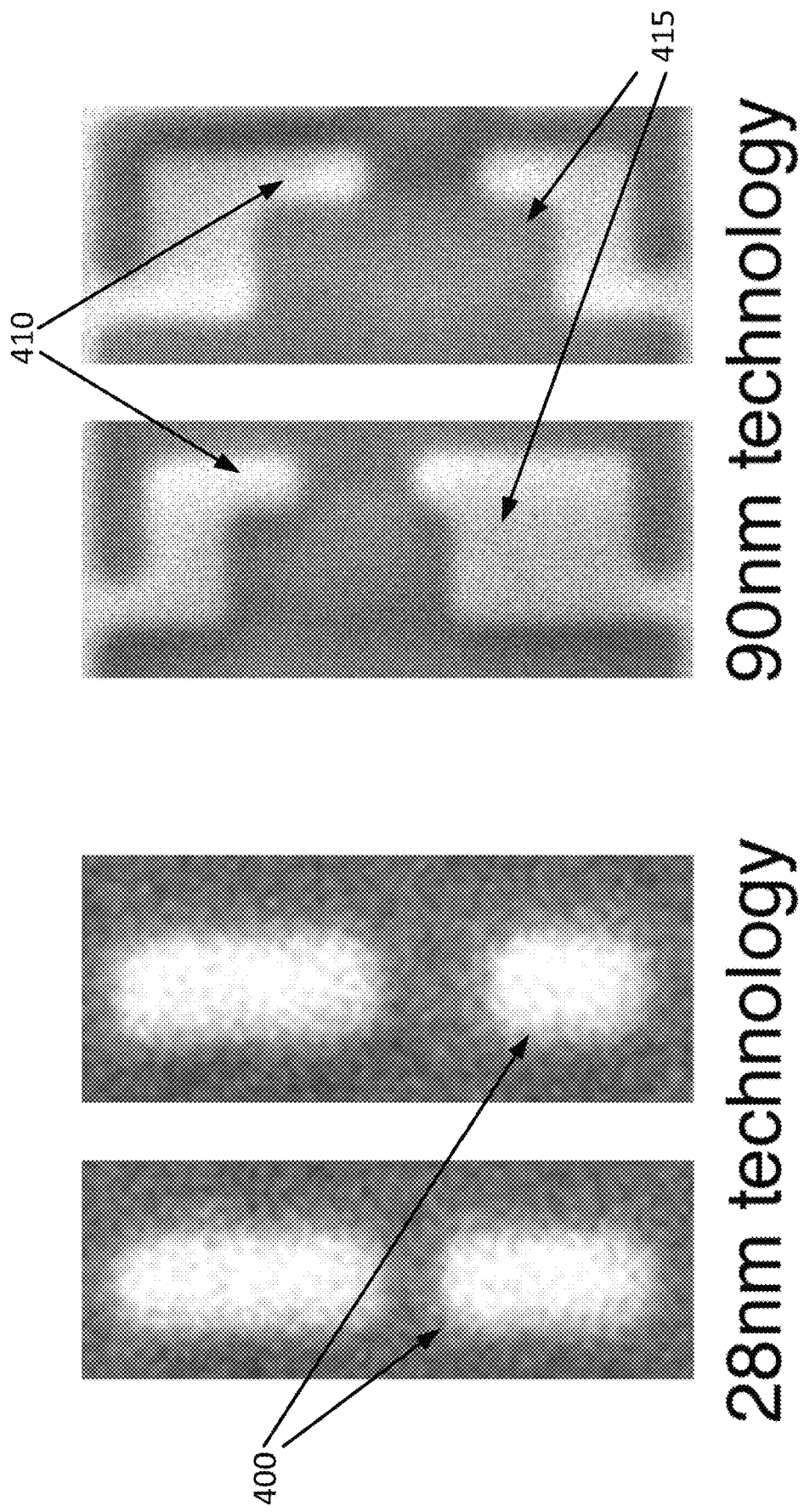
Figure 5:
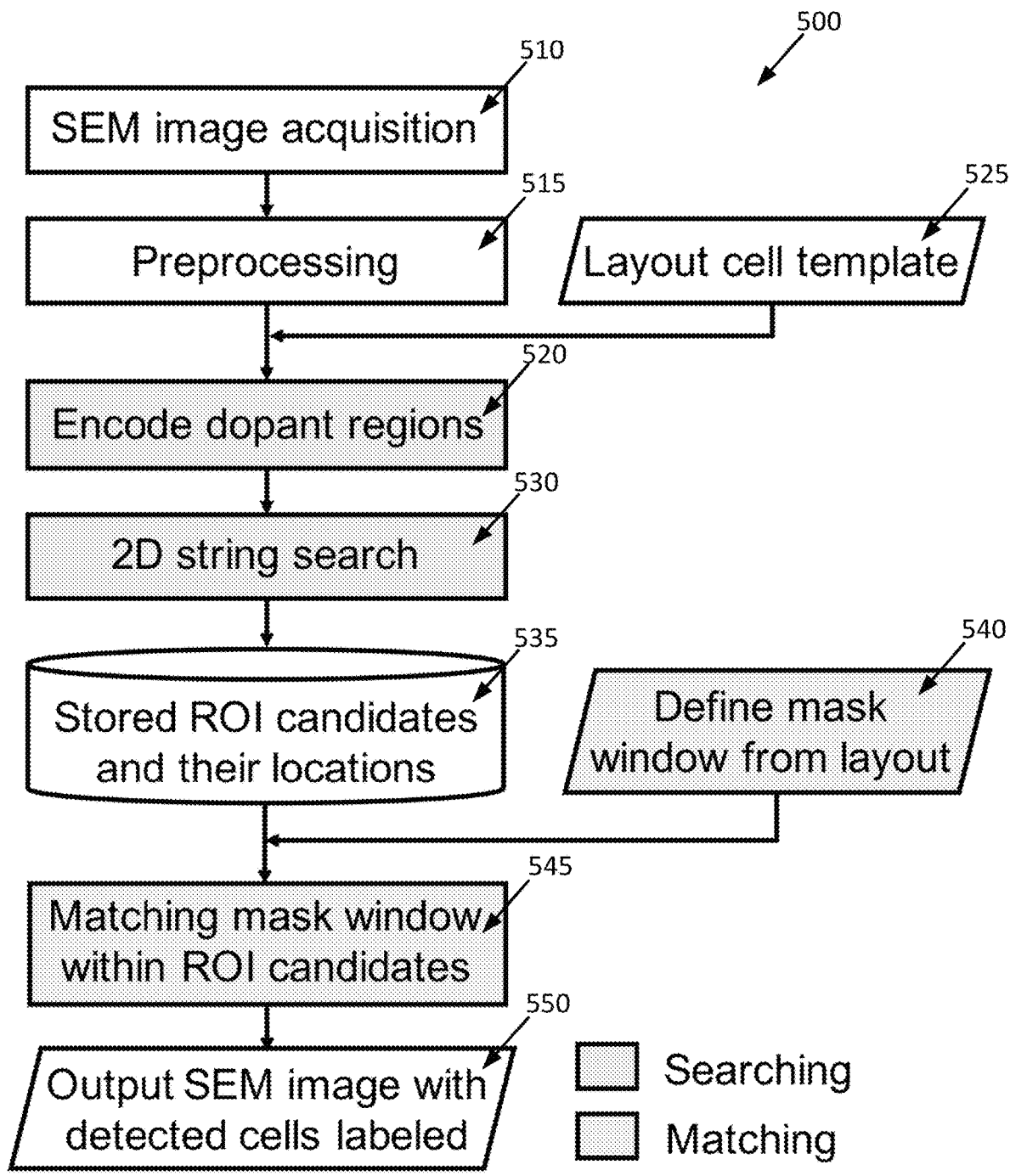
Figure 6A:
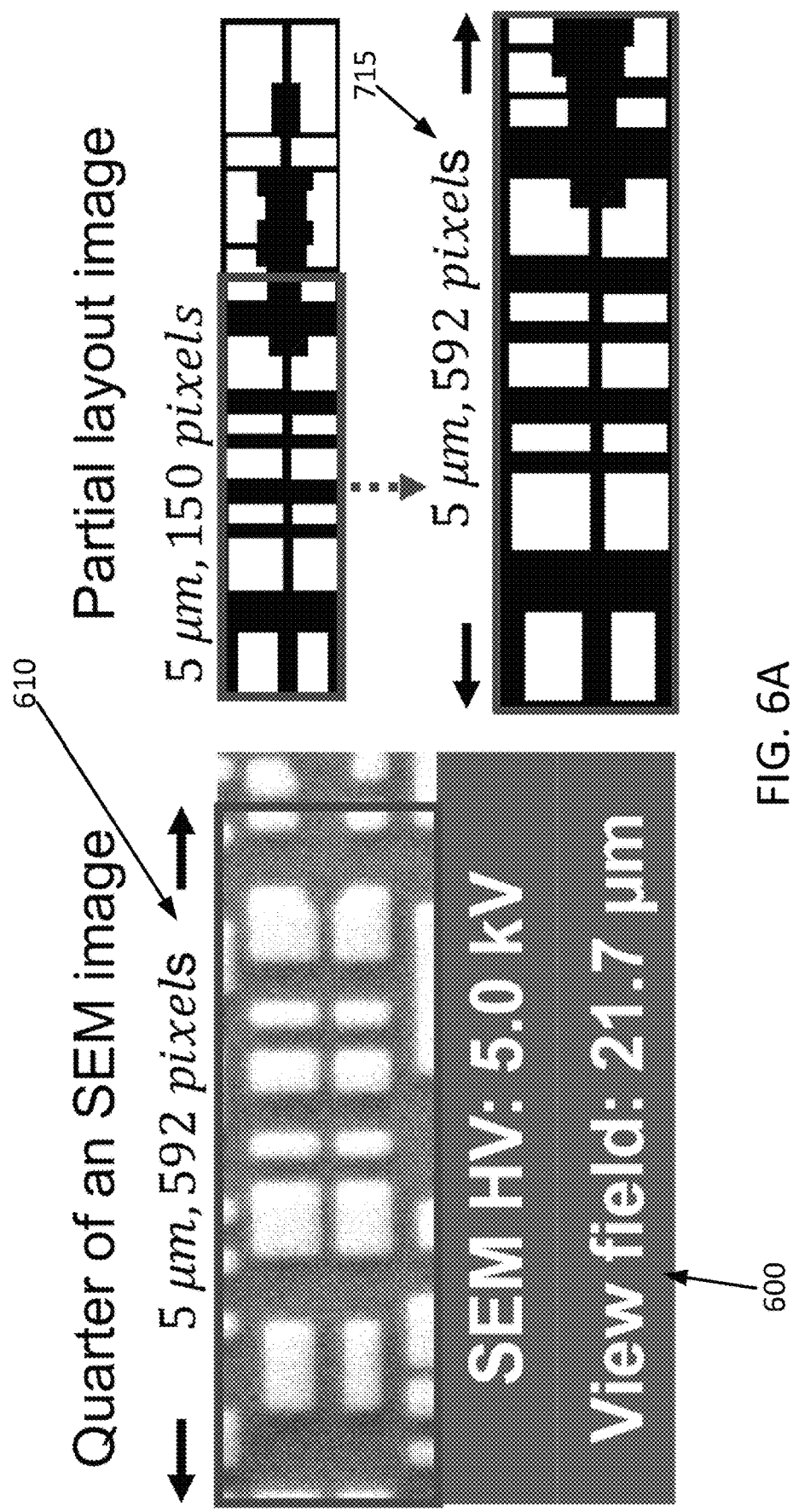
Figure 6B:
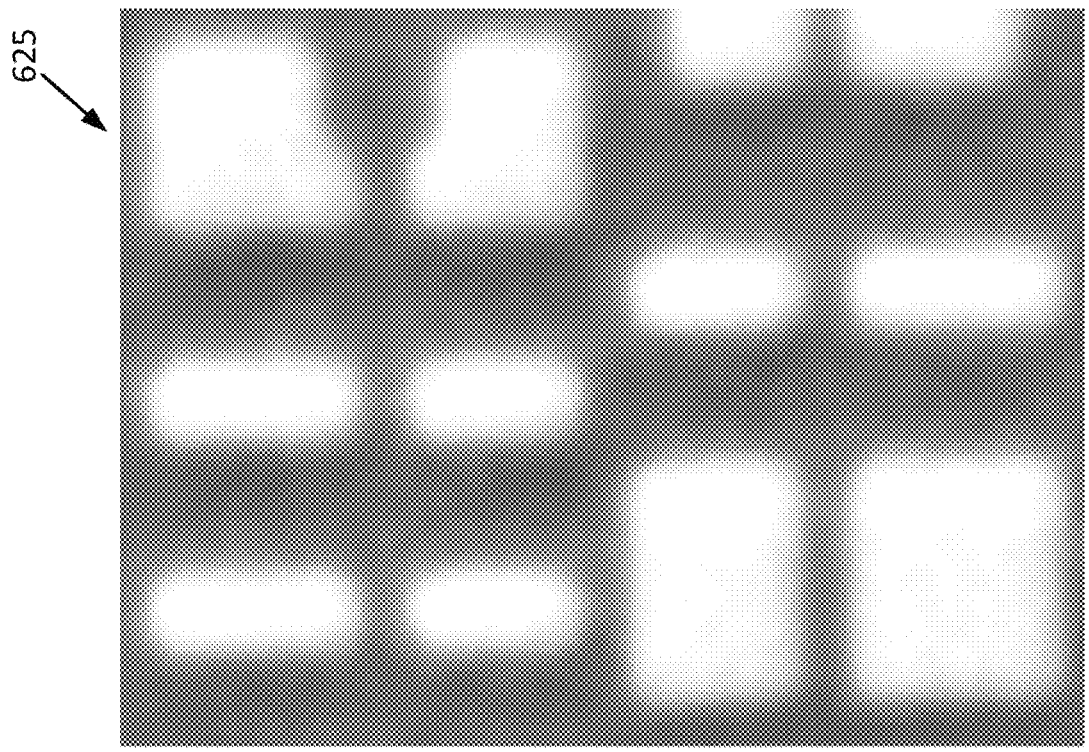
Figure 6B:
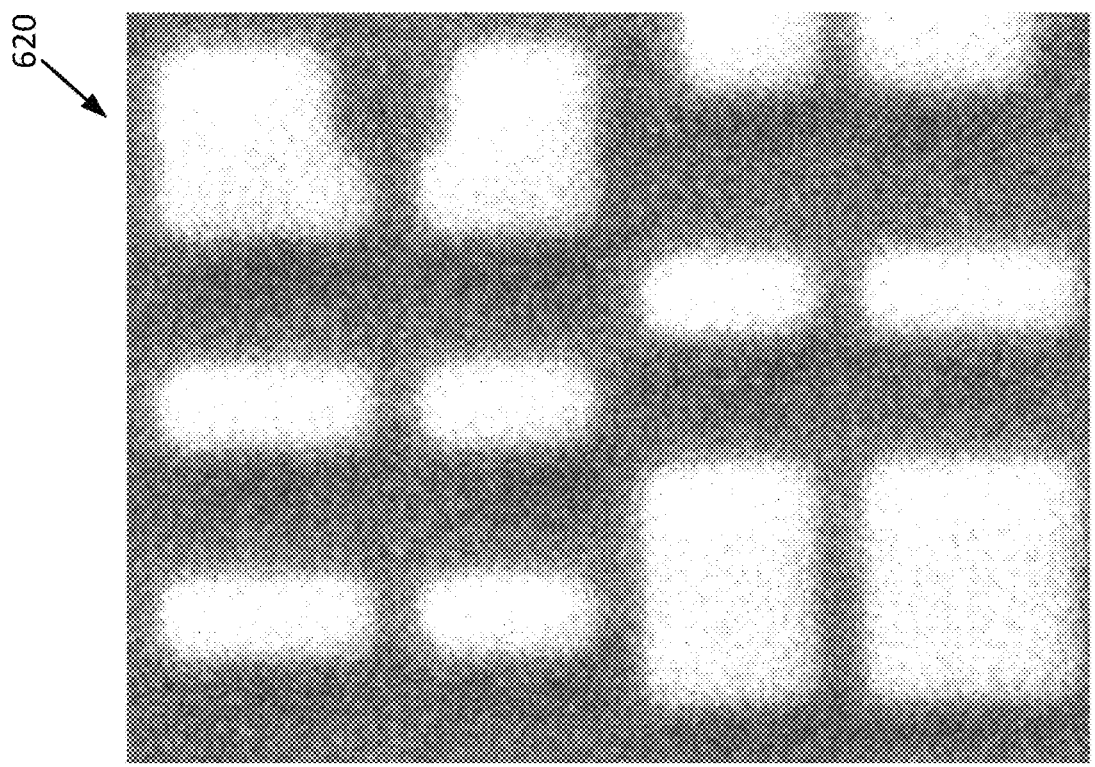
Figure 6C:
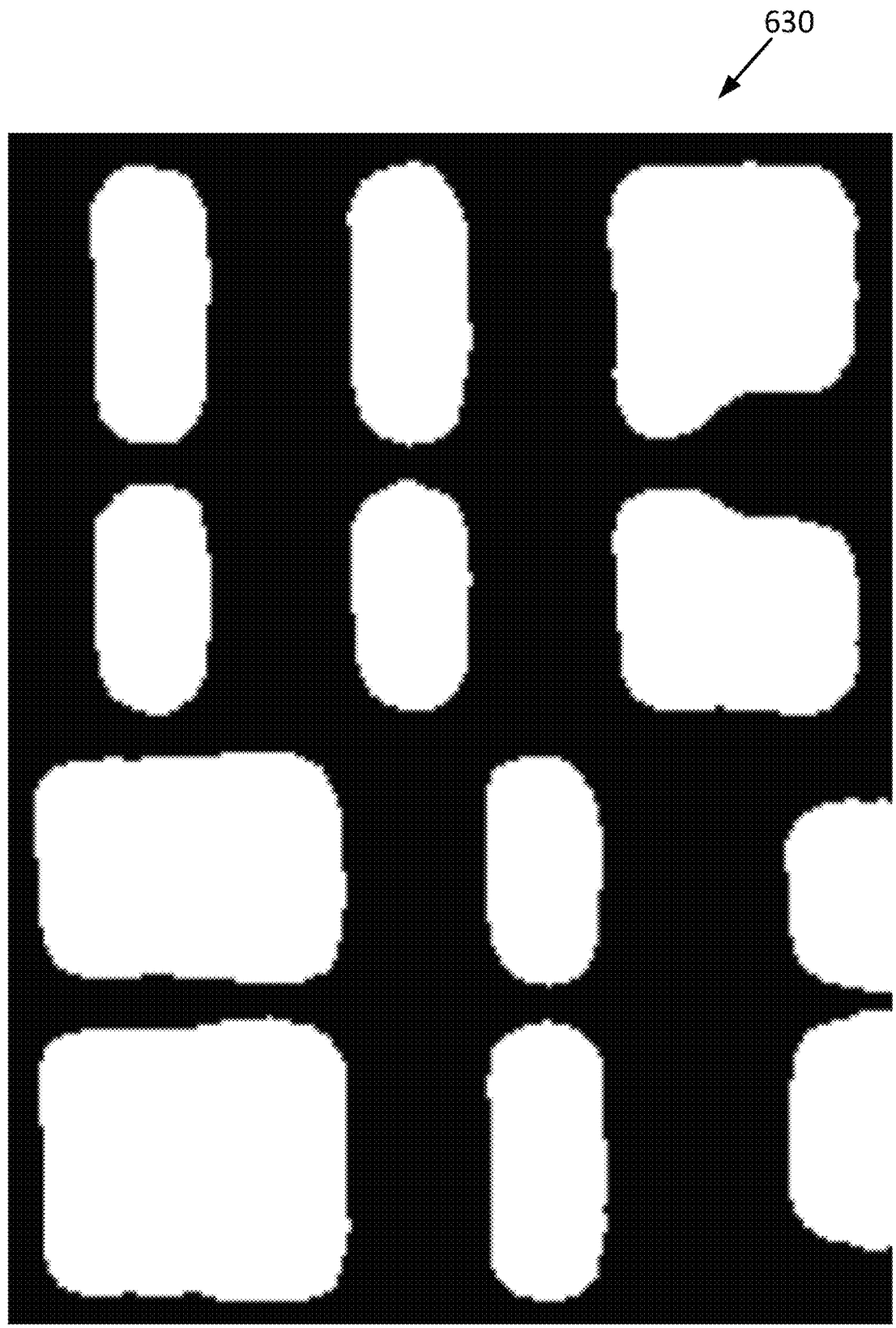
Figure 6D:
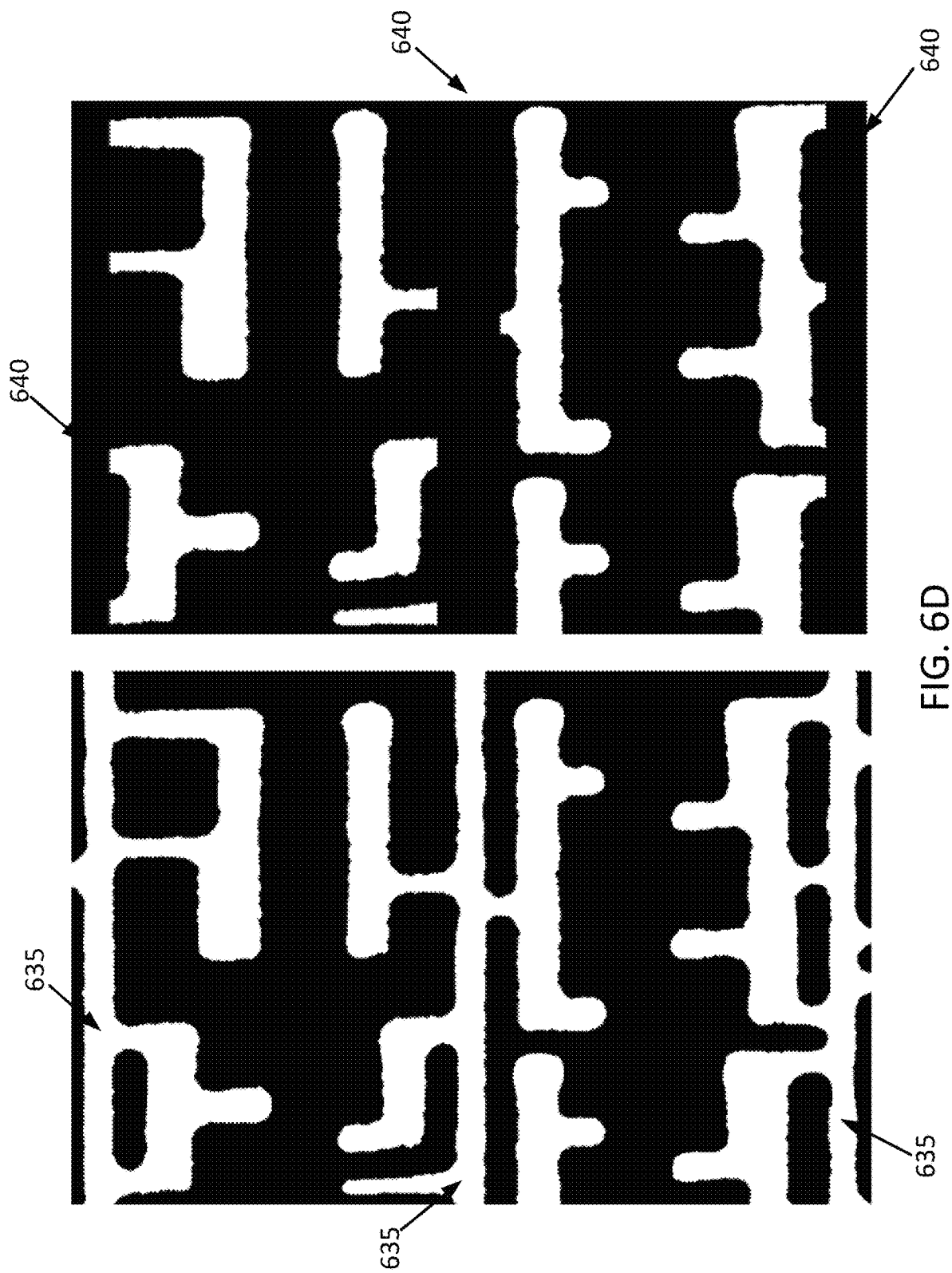
Figure 7:
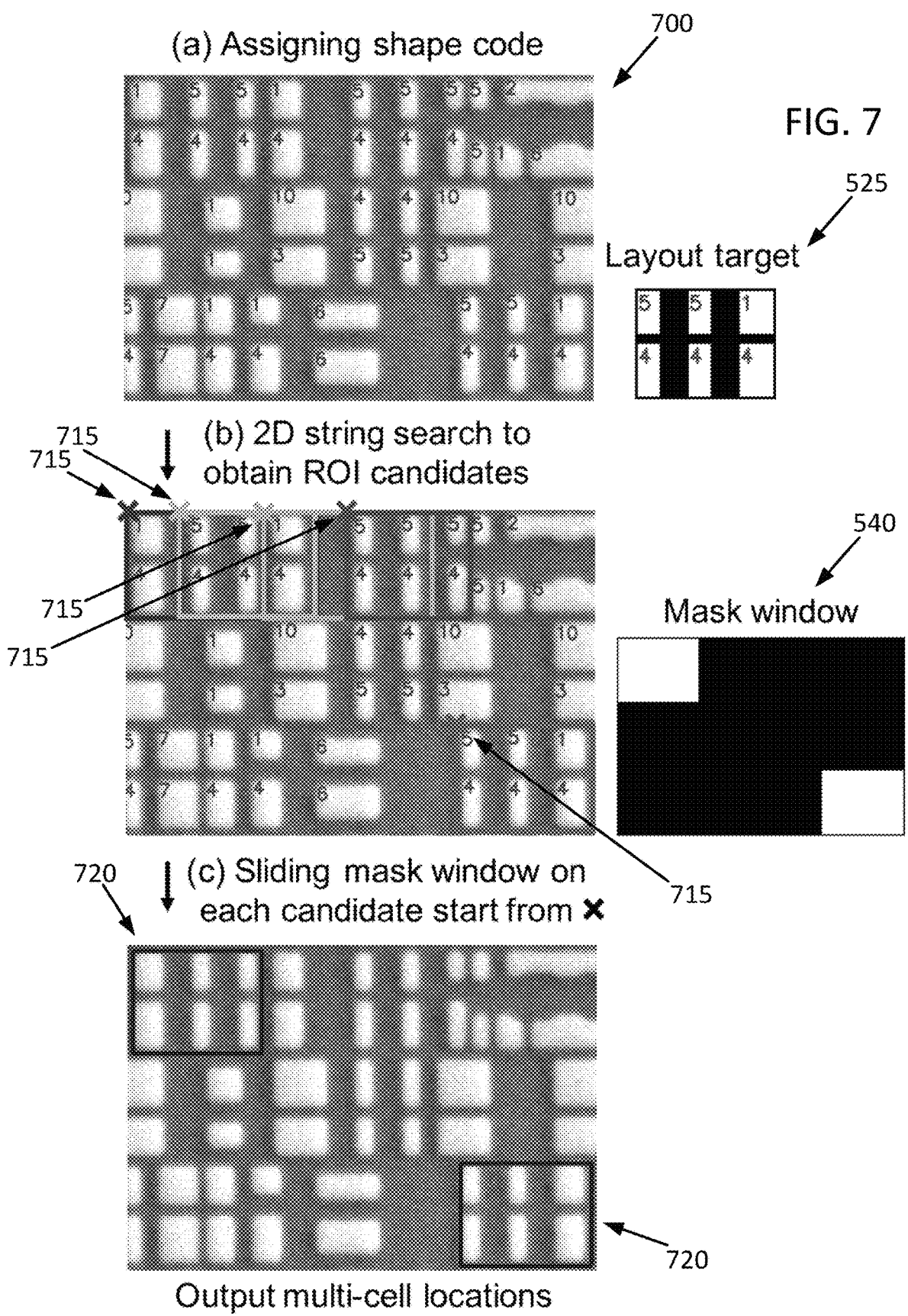
Figure 8:
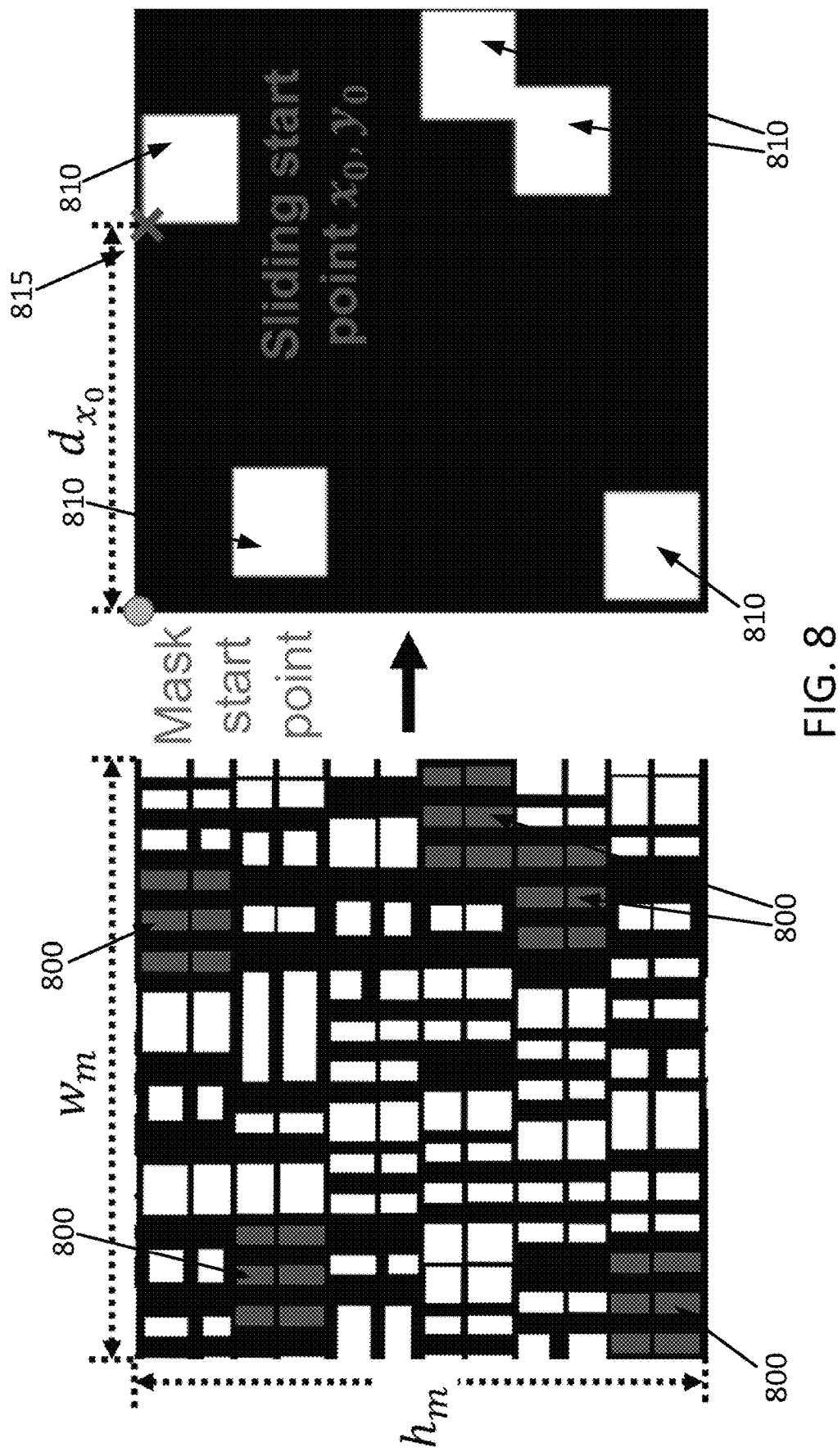
Figure 9:
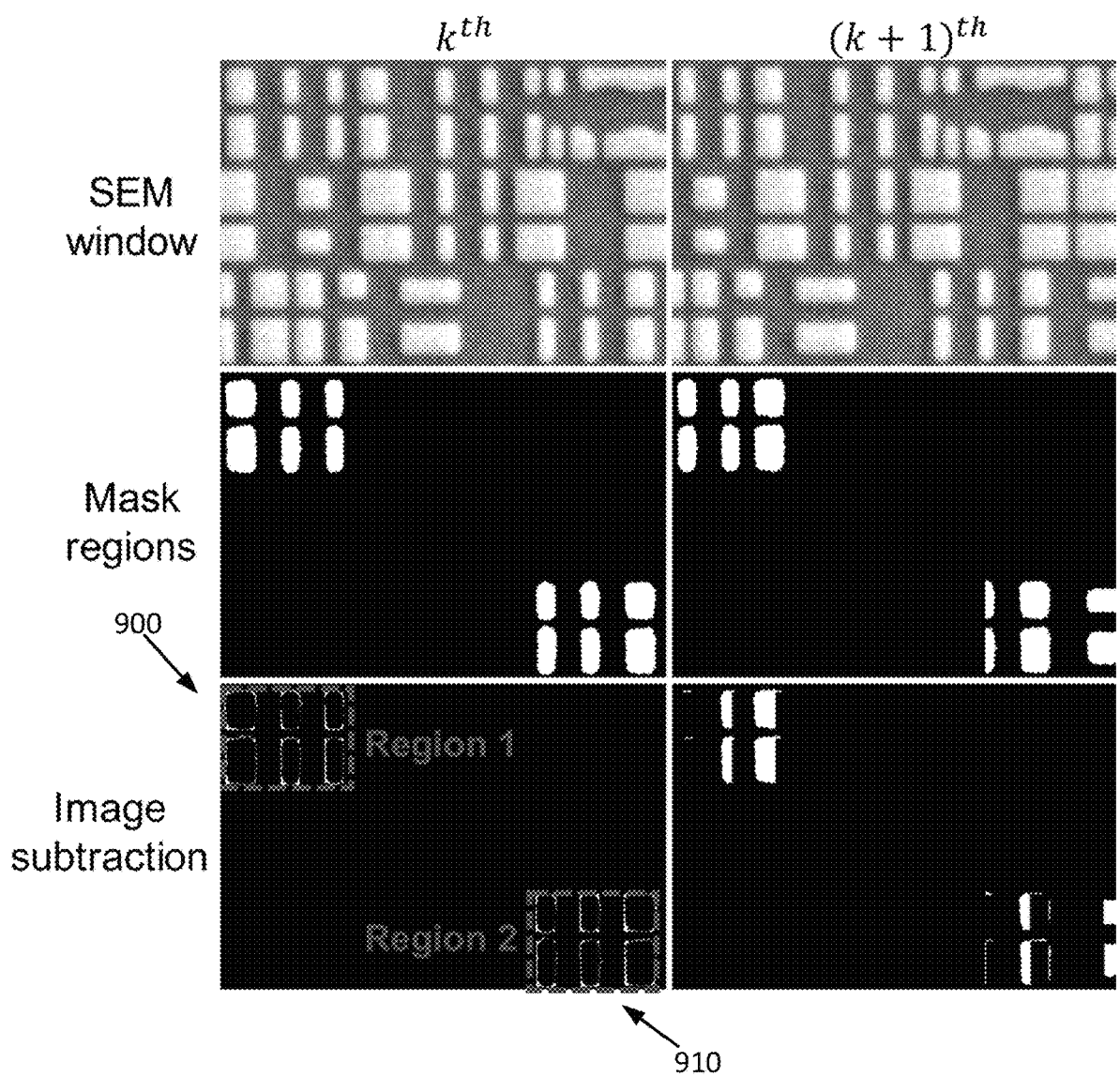
Figure 10:
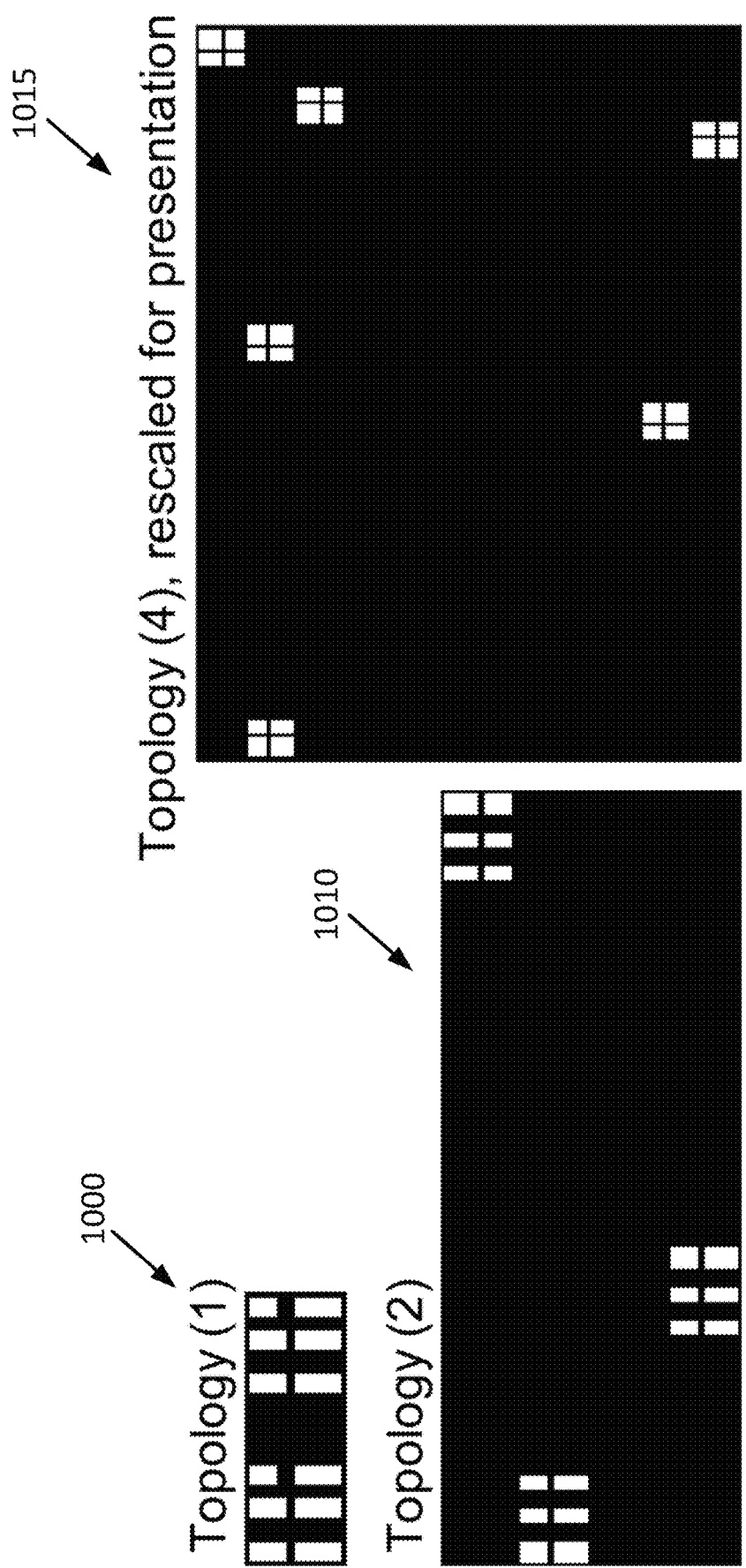

FIGS. 3A and 3B provide examples of different cells in the active layer;

FIG. 4 provides examples of cells only having a few pixels difference;

FIG. 5 provides a process flow for detecting target cells in accordance with various embodiments of the present disclosure;

FIG. 6A provides an example of performing scale alignment in accordance with various embodiments of the present disclosure;

FIG. 6B provides an example of removing image noise in accordance with various embodiments of the present disclosure;

FIG. 6C provides an example of performing binarization in accordance with various embodiments of the present disclosure;

FIG. 6D provides an example of VDD/ground line removal in accordance with various embodiments of the present disclosure;

FIG. 7 provides an example of performing 2D shape code searching using a mask window in accordance with various embodiments of present disclosure;

FIG. 8 provides an example of determining a mask window based on a layout area in accordance with various embodiments of the present disclosure;

FIG. 9 provides an example of applying image subtraction as the matching criteria in accordance with various embodiments of the present disclosure;

FIG. 10 provides example topologies of mask windows that can be used in accordance with various embodiments of the present disclosure; and FIGS. 11A-E provides results of localizing designed test cases using various embodiments of the process.

DETAILED DESCRIPTION OF VARIOUS EMBODIMENTS

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents. The following brief definition of terms shall apply throughout the application.

The term "comprising" means including but not limited to, and should be interpreted in the manner it is typically used in the patent context. The phrases "in one embodiment," "according to one embodiment," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment). If the specification describes something as "exemplary" or an "example," it should be understood that refers to a non-exclusive example; The terms "about" or "approximately" or the like, when used with a number, may mean that specific number, or alternatively, a range in proximity to the specific number, as understood by persons of skill in the art field.

If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

General Overview of Various Embodiments

Various embodiments of the present disclosure address a major obstacle in automatic hardware assurance systems, that being the localization of multiple standard cells (targets) in images such as SEM images. The remainder of the disclosure discusses embodiments of the disclosure with respect to their use for localization of target cells in SEM images. However, those of ordinary skill in the art should appreciate in light of this disclosure that various embodiments may be used in other applications and/or with other imaging such as, for example, NanoFab imaging.

Current standard cell localization is typically achieved by matching key-points of target cells from a reconstructed netlist that is obtained through full reverse engineering. However, such a netlist is often not available in applications that do not apply reverse engineering. To resolve this issue, various embodiments of the disclosure provide a learning-free, coarse-to-fine localization process for determining multi-target locations in an accurate and computationally efficient manner. Specifically, various embodiments involve firstly encoding cell dopants to two-dimensional (2D) string matrices and then leveraging a 2D string search algorithm for coarsely finding potential matches. Various embodiments continue with performing fine-matching on these matches by moving a topology-preserved mask window, resulting in final output of the multi-cell locations.

Some key advantages provided by various embodiments of the disclosure include: encoding footprints of standard cells to 2D string matrices resulting in converting the image-based localization problem to a 2D string search problem and as a result, speeding up the searching process and enabling the detection of image sequences; applying a 2D string search algorithm that coarsely eliminates cell footprints that are very different from the target cells and as a result, reducing the computational effort for the next fine-matching operation further; determining the mask window from the layout image based on a searching requirement and as a result, preserving the topology of target cells and enabling multi-target localization; performing image subtraction used for fine matching between the layout reference and the SEM image and as a result, providing a process that is learning-free with improved generalizability to technology changes; and providing a process that is easy to implement and can be implemented into other imaging platforms similar to SEM, such as NanoFab imaging.

Computer Program Products, Systems, Methods, and Computing Entities

Embodiments of the present disclosure may be implemented in various ways, including as computer program products that comprise articles of manufacture. Such computer program products may include one or more software components including, for example, software objects, methods, data structures, and/or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SWIM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of a data structure, apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically configured machines performing the steps or operations specified in the block diagrams and flowchart illustrations. Accordingly, the block diagrams and flowchart illustrations support various combinations of embodiments for performing the specified instructions, operations, or steps.

Exemplary Scanning Electron Microscopy System

Although various embodiments of the disclosure may be carried out with respect to different types of imaging modalities, the remaining disclosure it discussed with respect to using various embodiments in a Scanning Electron Microscopy (SEM) environment. A SEM environment is used to illustrate these embodiments and to help facilitate the reader's understanding of the embodiments. Thus, it should be understood that embodiments of the disclosure may be used along with other imaging modalities and the discussion of various embodiments involving an SEM environment does not limit the scope of the disclosure.

Figure 1:
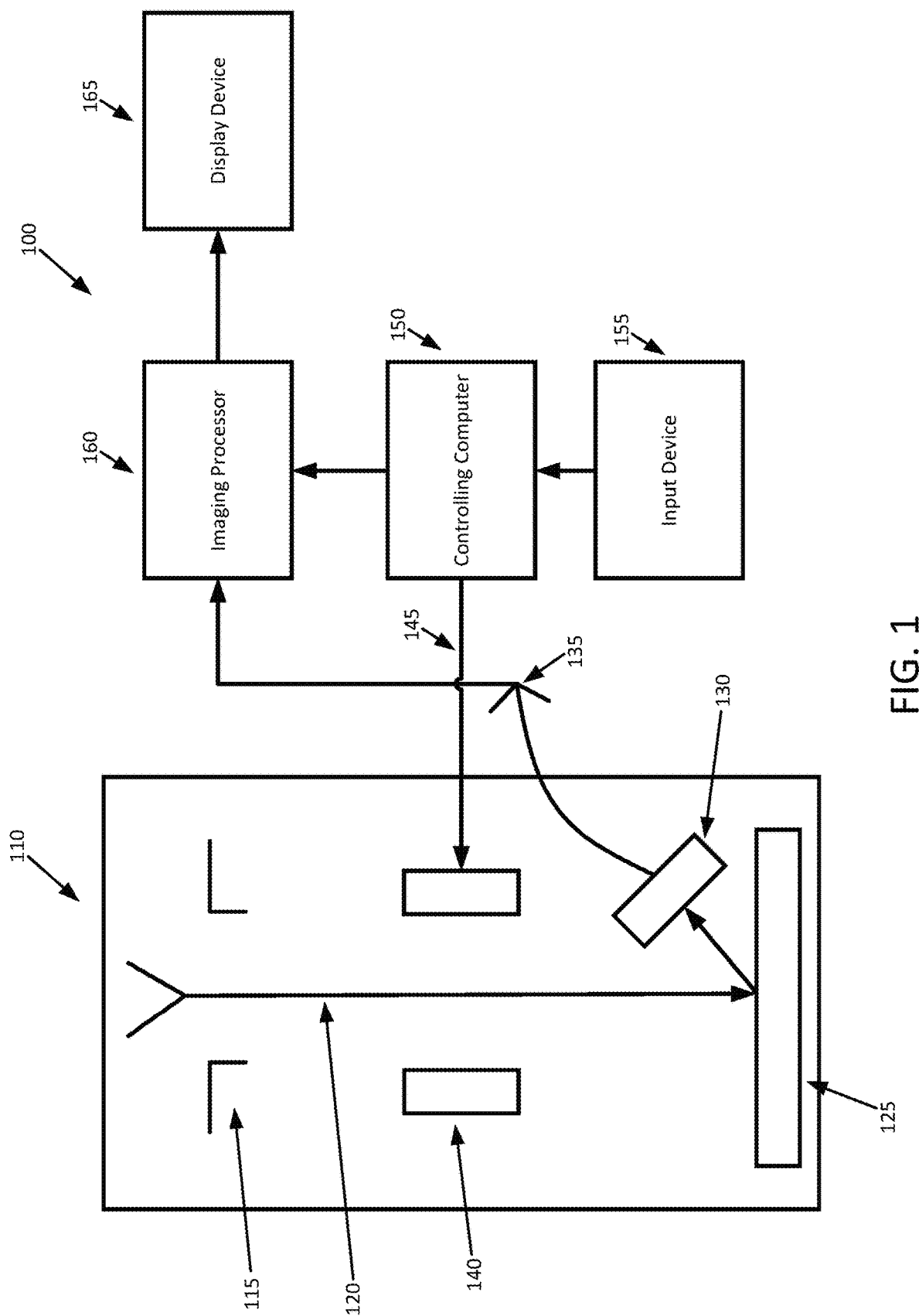
FIG. 1 is a schematic of a scanning electron microscope system that may be used in accordance with various embodiments of the present disclosure.

Turning now to FIG. 1, this figure provides a schematic configuration of a SEM system 100 that can be used in accordance with various embodiments of the present disclosure. The body 110 of the SEM microscope includes an electron gun 115 through which an electron beam 120 is emitted and converged by an electron lens (not shown) and irradiated on a sample 125. An electron detector 130 detects the intensity of secondary electrons generated from the surface of the sample 125 or intensity of reflected electrons by electron beam irradiation. Accordingly, an amplifier 135 amplifies the electron beam 120 and a deflector 140 deflects the beam 120, subjecting the beam 120 to raster scanning on the sample surface according to a control signal 145 provided by a controlling computer 150. Here, the control signal 145 indicates parameters for performing the scanning of the sample 125 such as, for example, the magnification that is to be used. One or more input devices 155 such as a keyboard and/car a mouse may be connected to the controlling computer 150. A signal outputted from the amplifier 135 is converted from analog to digital inside an imaging processor 160 to generate digital image data. Accordingly, a display device 165 may be used to view the image data. Moreover, the imaging processor 160 may include memory for storing the digital image data and may perform various imaging processes, display controls, and other processes as detailed further herein.

Exemplary Computing Entity

Figure 2:
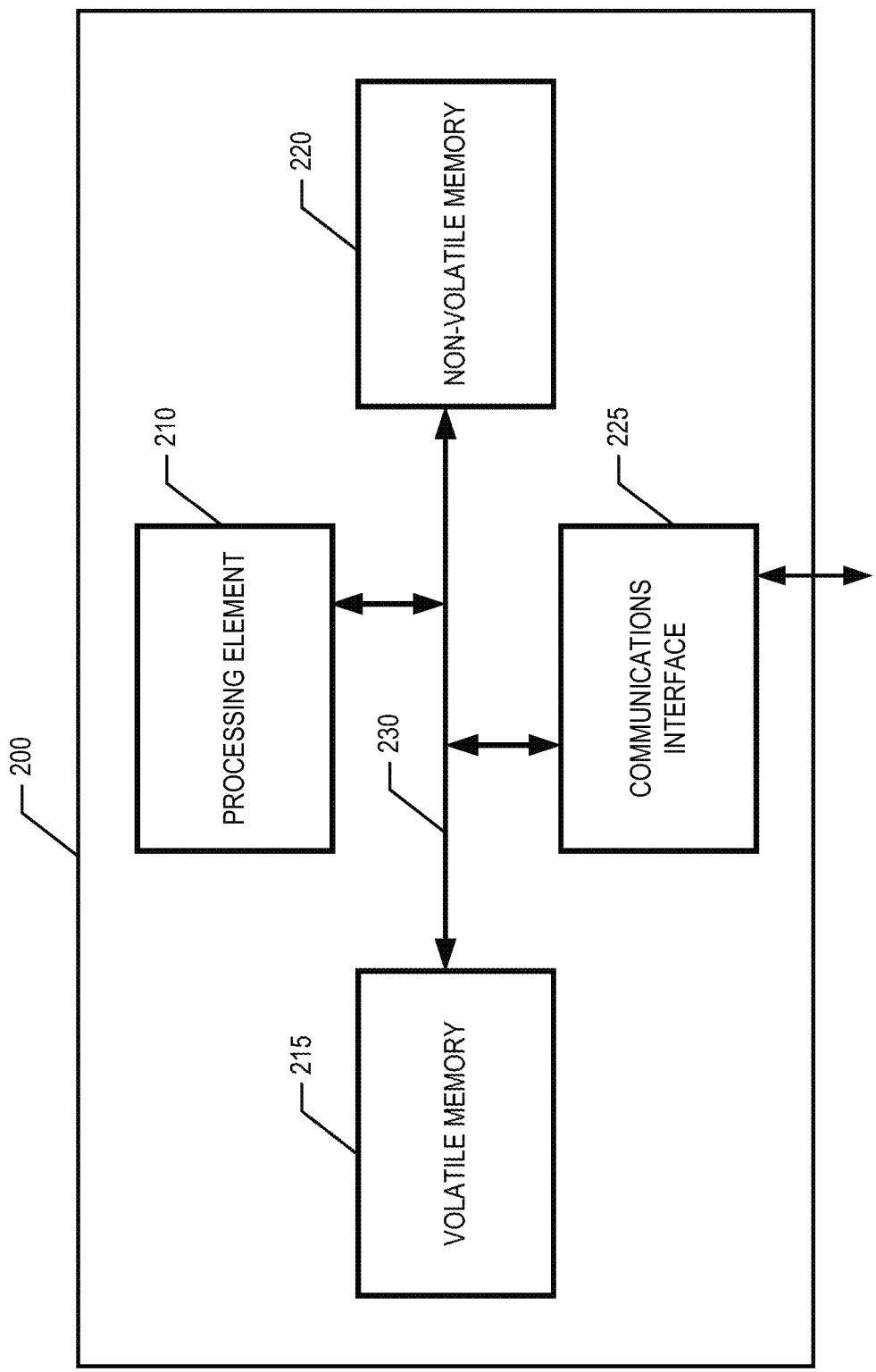
FIG. 2 is a schematic of a computing entity that may be used in accordance with various embodiments of the present disclosure.

FIG. 2 provides a schematic of a computing entity 200 that may be used in accordance with various embodiments of the present disclosure. For instance, the computing entity 200 may be the controlling computer 150 and/or imaging processor 160 found within the SEM system 100 previously described in FIG. 1. While in other instances, the computing entity 200 may be a stand-alone device used in conjunction with images produced by the SEM system 100. In general, the terms computing entity, entity, device, system, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

Although illustrated as a single computing entity, those of ordinary skill in the art should appreciate that the computing entity 200 shown in FIG. 2 may be embodied as a plurality of computing entities, tools, and/or the like operating collectively to perform one or more processes, methods, and/or steps. As just one non-limiting example, the computing entity 200 may comprise a plurality of individual data tools, each of which may perform specified tasks and/or processes.

Depending on the embodiment, the computing entity 200 may include one or more network and/or communications interfaces 225 for communicating with various computing entities, such as by communicating data, content, information, and/or similar terms used herein interchangeably that can be transmitted, received, operated on, processed, displayed, stored, and/or the like. Thus, in certain embodiments, the computing entity 200 may be configured to receive data from one or more data sources and/or devices as well as receive data indicative of input, for example, from a device.

The networks used for communicating may include, but are not limited to, any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks. Further, the networks may have any suitable communication range associated therewith and may include, for example, global networks (e.g., the Internet), MANs, WANs, LANs, or PANs. In addition, the networks may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms provided by network providers or other entities.

Accordingly, such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the computing entity 200 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1×(1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol. The computing entity 200 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

In addition, in various embodiments, the computing entity 200 includes or is in communication with one or more processing elements 210 (also referred to as processors, processing circuitry, and/or similar terms used herein interchangeably) that communicate with other elements within the computing entity 200 via a bus 230, for example, or network connection. As will be understood, the processing element 210 may be embodied in several different ways. For example, the processing element 210 may be embodied as one or more complex programmable logic devices (CPLDs), microprocessors, multi-core processors, coprocessing entities, application-specific instruction-set processors (ASIPs), and/or controllers. Further, the processing element 210 may be embodied as one or more other processing devices or circuitry. The term circuitry may refer to an entirely hardware embodiment or a combination of hardware and computer program products. Thus, the processing element 210 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 210 may be configured for a particular use or configured to execute instructions stored in volatile or non-volatile media or otherwise accessible to the processing element 210. As such, whether configured by hardware, computer program products, or a combination thereof, the processing element 210 may be capable of performing steps or operations according to embodiments of the present disclosure when configured accordingly.

In various embodiments, the computing entity 200 may include or be in communication with non-volatile media (also referred to as non-volatile storage, memory, memory storage, memory circuitry and/or similar terms used herein interchangeably). For instance, the non-volatile storage or memory may include one or more non-volatile storage or memory media 220 such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media 220 may store files, databases, database instances, database management system entities, images, data, applications, programs, program modules, scripts, source code, object code, byte code, compiled code, interpreted code, machine code, executable instructions, and/or the like. The term database, database instance, database management system entity, and/or similar terms used herein interchangeably and in a general sense to refer to a structured or unstructured collection of information/data that is stored in a computer-readable storage medium.

In particular embodiments, the memory media 220 may also be embodied as a data storage device or devices, as a separate database server or servers, or as a combination of data storage devices and separate database servers. Further, in some embodiments, the memory media 220 may be embodied as a distributed repository such that some of the stored information/data is stored centrally in a location within the system and other information/data is stored in one or more remote locations. Alternatively, in some embodiments, the distributed repository may be distributed over a plurality of remote storage locations only. As already discussed, various embodiments contemplated herein use data storage in which some or all the information/data required for various embodiments of the disclosure may be stored.

In various embodiments, the computing entity 200 may further include or be in communication with volatile media (also referred to as volatile storage, memory, memory storage, memory circuitry and/or similar terms used herein interchangeably). For instance, the volatile storage or memory may also include one or more volatile storage or memory media 215 as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media 215 may be used to store at least portions of the databases, database instances, database management system entities, data, images, applications, programs, program modules, scripts, source code, object code, byte code, compiled code, interpreted code, machine code, executable instructions, and/or the like being executed by, for example, the processing element 210. Thus, the databases, database instances, database management system entities, data, images, applications, programs, program modules, scripts, source code, object code, byte code, compiled code, interpreted code, machine code, executable instructions, and/or the like may be used to control certain aspects of the operation of the computing entity 200 with the assistance of the processing element 210 and operating system.

As will be appreciated, one or more of the computing entity's components may be located remotely from other computing entity components, such as in a distributed system. Furthermore, one or more of the components may be aggregated and additional components performing functions described herein may be included in the computing entity 200. Thus, the computing entity 200 can be adapted to accommodate a variety of needs and circumstances.

Technical Challenges Addressed by Various Embodiments

Various embodiments of the disclosure address challenges mainly from three aspects: characteristics of target objects, SEM image properties, and limited availability of reference (training) images/samples. First, the characteristics of the target objects are unique in IC images. Unlike most existing processes that treat the target as a connected object, the simplest target cell in an IC's active layer includes at least a pair of disconnected N and P dopants 300, and some larger cells are composed of several dopant pairs 310, as shown in FIG. 3A. Meanwhile, as shown in FIG. 3B, cells can be different only in the arrangement of dopants 315, 320. Considering the above two scenarios, a challenge for various localization processes is being capable of finding a sequence of image patterns rather than a single object. Moreover, differences 400, 410, 415 between cell footprints may only appear in a few pixels, as shown in FIG. 4. Thus, localization processes that are only based on global features, such as blob detection (morphology) or the regional-attention-based localization, may fail easily.

Second, as previously mentioned, SEM images have different properties compared to optical images. For example, SEM images of an IC's active layer do not contain sufficient color features (including RGB and intensity differences). SEM images are generated from the electron signals, where the image intensity values are determined by the number of electrons reflected from the sample surface. Each layer of an IC usually includes two materials, the background silicon substrate and the foreground dopant regions (or the metal for the metal-1 layer). As a result, the intensity differences are often unable to distinguish target cells from other cells. In such a scenario, color-based localizations, including a sliding window coupled with a color feature extractor or a visual saliency map, are not applicable.

Third, the source and number of available reference images/samples that can be used in a localization task is typically limited. For example, reference images used in many IC Trojan detection applications are either from SEM images, synthesized SEM images, or layout images. Since golden cell localization is normally an operation used for finding the reference SEM image samples for later usage, only the latter two image sources can be considered for localization. On the other hand, existing research using synthesized SEM images only simulate the process variation (PV) but nevertheless, its simulation accuracy has not been validated. In addition, research that has been conducted on exploring SEM image noise has not considered the PV existing in hardware assurance tasks. In such a situation, synthesized images often cannot provide sufficient image variations for training learning-based methods, and this constraint also exists in the ideal layout images.

Thus, various embodiments of the disclosure provided herein address the above-mentioned challenges. Specifically, various embodiments involve the use of a windowing searching technique (e.g., process) with two modifications: 1) encoding cell footprints based on their size and transforming the image search problem to a 2D string search problem, and 2) using a layout-determined mask window to preserve target cell topology. Such use of the example windowing searching technique enables target cell patterns to be identified in SEM images accurately without requiring a large number of reference images. As such, computing resources such as storage space are conserved. Similarly, overall computational load of a computing entity that may be used in accordance with various embodiments of the present disclosure (e.g., computing entity 200) is efficiently conserved through the transformation of the image search problem into a 2D string search problem. Further details are now provided with respect to these embodiments.

Exemplary System Operation

The functionality described herein may be carried out on a computing entity 200 such as previously described in FIG. 2. Accordingly, the computing entity 200 may carry out the functionality as logical operations and these logical operations may be implemented (1) as a sequence of computer implemented acts or one or more program modules running on the computing entity and/or (2) as interconnected machine logic circuits or circuit modules within the computing entity. The implementation is a matter of choice dependent on the performance and other requirements of the computing entity 200. Accordingly, the logical operations described herein are referred to variously as states, operations, structural devices, acts, or modules. These operations, structural devices, acts, and modules may be implemented in software, in firmware, in special purpose digital logic, and any combination thereof. Greater or fewer operations may be performed than shown in the figures and described herein. These operations may also be performed in a different order than those described herein.

Object Localization Module

Turning now to FIG. 5, additional details are provided regarding a process flow for detecting target cells according to various embodiments. FIG. 5 is a flow diagram showing an object localization module for performing such functionality according to various embodiments of the disclosure. Depending on the embodiment, the object localization module can be implemented within a stand-alone and/or add-on system to an existing image modality, or integrated into an existing software framework of the image modality. In an example embodiment, the computing entity 200 comprises the object localization module, or the computing entity 200 is configured to perform various operations of the process flow 500.

The process flow 500 begins with the object localization module receiving an input SEM image in Operation 510. In various embodiments, the input SEM image is received (e.g., at the computing entity 200) via an application programming interface (API) request, call, query, and/or the like. In various embodiments, the input SEM image is received (e.g., captured) in real-time; for example, the computing entity 200 is, comprises, is in communication with, and/or the like the controlling computer 150 of the SEM system 100 and is configured to cause capture of the input SEM image.

As previously mentioned, various embodiments require cell encoding to accomplish the localization process. Since the obtained SEM image may contain an amount of image noise, e.g., noise signal or image rotation, and/or capture unique structures of different technology ICs, e.g., 28 nm IC does not show voltage (e.g., VDD)/ground lines in the active layer while the 130 nm IC does, the SEM image is enhanced and normalized in particular embodiments before further processing. Thus, the object localization module performs preprocessing on the image in Operation 515. Accordingly, depending on the embodiment, preprocessing may involve, for instance, SEM image scale alignment, image noise removal, image binarization, voltage/ground line removal, and/or the like.

Therefore, turning briefly to FIGS. 6A-6D, since various embodiments make use a mask-window to restrict the topological relation between cells, it may be needed to align the window with the SEM image area that has a size that can be covered by the mask. In particular embodiments, the object localization module is configured to bridge the alignment using one of the SEM image parameters such as view field or field of view (FoV) 600 that represents the physical IC area being imaged. Accordingly, FoV 600 provides the ratio of pixel size versus physical size 610 for SEM image, while this ratio for the layout can be obtained from the design specification. The layout can then be resized to have the sample pixel scale as the SEM image 615. Note, as shown in FIG. 6A, the image areas used for alignment do not need to be in the same area in particular embodiments, but they should in general have the same physical size. In various embodiments, the FoV 600 and other various metadata for the input SEM image is received with the input SEM image.

Accordingly, the object localization module is configured in particular embodiments to reconstruct lines and edges in the SEM image based on the assumption of existing Gaussian noise. Specifically, in these particular embodiments, the object localization module applies a Gaussian filter, and then a bilateral filter to smooth the cell edges further. FIG. 6B provides example of a raw SEM image 620 that has been denoised into a denoised SEM image 625.

A binary image only contains pixels with two values, "0" and "1" (or "255"), that help to reduce calculation effort for further processing. Thus, in various embodiments, the object localization module performs binarization on the image. For instance, in particular embodiments, the object localization module applies Otsu thresholding to the denoised grayscale SEM image for obtaining a binary image 630 as shown in FIG. 6C. The example binary image 630 illustrated in FIG. 6C may result from application of Otsu thresholding to the denoised SEM image 625. After binarization, the pixel rows of voltage/ground lines in some technologies have the value "1," which is the same as cell footprints. Therefore, in some embodiments, the object localization module removes these lines 635 by overwriting the pixels for these lines with the value "0" 640 when the number of "1" valued pixels is equal to the image width as shown in FIG. 6D. That is, it may be assumed that voltage/ground lines represented in the binary image 630 span the entire width of the binary image 630, and therefore can be identified and removed based at least in part on identifying pixel rows only having pixels with the value "1".

2D shape encoding is used in various embodiments to speed up the searching process by eliminating cell footprints that are very different from the target cells. Thus, returning to FIG. 5, the object localization module in these embodiments encodes the cell footprints with different digits (shape codes) to transform the image into a 2D string matrix in Operation 520. Accordingly, the object localization module carries out this operation in particular embodiments by k-means clustering using the width and height features of each N/P dopant (a 2D feature vector). Generally speaking, the number of k-means clusters is the number of unique digits assigned to the dopants, where fewer clusters typically lead to more similar digit sequences and longer searching time, while too many clusters can result in different sequences for two identical cells. Thus, in some embodiments, the accurate yet fastest localization on images is achieved when the cluster number is set to ten, although the cluster number can be set to a different value in other embodiments, Accordingly, in various embodiments, the object localization module is configured to apply encoding to all of the cells in the SEM image and a target layout cell 525 simultaneously, which outputs 2D string matrices representing the SEM cells and template target cells, respectively. In various embodiments then, the process flow 500 may include receiving a target layout cell 525 and encoding the target layout cell 525. In various example embodiments, the target layout cell 525 is received with the input SEM image. Turning briefly to FIG. 7, an encoded image 700 and target layout cell 525 are shown. While not explicitly illustrated, it will be appreciated that the encoded image 700 may be an image resulting from the encoding of the binary image 630, such as the example binary image 630 illustrated in FIG. 6C.

Next, the object localization module performs string searching by applying a string search algorithm in Operation 530 on the encoded dopant regions using the encoded target layout cell 525 as the template. For example, the object localization module may apply a string search algorithm such as Boyer-Moore, Knuth-Morris-Pratt, Baeza-Yates, and/or the like, and combinations and/or modifications thereof, in various example embodiments. For instance, the Boyer-Moore (BM) algorithm and its variations are commonly used for 1D pattern searching and have been demonstrated efficient for practical applications, especially for searching a target pattern with many digits/codes. As mentioned earlier, each cell footprint includes two vertically aligned N and P regions that form a 2D relation. Thus, the 2D BM string can be applied in particular embodiments. In addition, before searching, the object localization module flips the target cell horizontally, vertically, and diagonally in some embodiments to include all possible orientations that could be designed. Furthermore, in some embodiments, the object localization module may be configured to use a tolerance for twenty percent mismatched codes in consideration of the 2D searching the exact pattern, which may result in ROI candidates being missed due to errors in the encoding. Thus, in various embodiments, the searching technique simplifies an image problem that requires a pixel-to-pixel calculation to a sub-string finding task that only involves digits. Once the ROI candidates that may possibly contain target cells and their locations have been identified, the object localization module stores them in Operation 535. An example of ROI candidates 715 identified in an image are shown in FIG. 7.

After obtaining the ROI candidates 715, the object localization module in various embodiments then slides the mask window 540 on each ROI candidate 715 in Operation 545, and the matching is simultaneously applied to identify the target cells. That is, sliding of the mask window 540 on each ROI candidate 715 may be understood as sequentially (e.g., iteratively) and individually comparing the mask window 540 with the encoded image 700. The mask window is determined in various embodiments based on the layout area that includes the target cells 800, as shown in FIG. 8. Note, the white areas 810 in FIG. 8 within the mask window are the locations of the target cells under inspection. The sliding start point is positioned at the top-left point of the most top-left target cell 815, in various embodiments.

Matching criteria in window search techniques can vary depending on the application requirements on time cost and accuracy. A more complex feature matching normally increases the overall localization time but has higher reliability. Accordingly, in particular embodiments, the object localization module applies image subtraction as the matching criteria, as can be visualized in FIG. 9. The layout cell 525 and each ROI candidate 715 are normalized to remain three background (black) pixels in the surrounding, and the ROI candidates 715 are resized to the template size. Then, for the $k^{th}$ sliding mask window, the object localization module performs subtraction between the normalized layout template and each ROI candidate 715, and the number of pixel differences for each window is accumulated and denoted as dk (summation of white pixels in Region 1 900 and Region 2 910 in FIG. 9). The recorded information for this window is:

$$\text{mask}_k = [\text{dist}_k, (pt0_1, pt1_1), \ldots, (pt0_n, pt1_n)] \quad (1)$$

where n is the number of target regions in one mask window, pt0 and pt1 are the top-left and bottom-right coordinates of one region, accordingly. Finally, the located SEM window is defined to have the minimum score among all dist values, and the target regions/cells 720 are located by the recorded coordinates, correspondingly. Finally, the object localization module outputs the image with the labeled detected cells in Operation 550.

Thus, although various embodiments of the process involve applying a sliding technique, sliding times are significantly reduced as a result of not having to slide for every region found in the image and only having to slide for those regions (ROIs) found in the image that are highly likely to contain target cells. Consequently, the time spent on matching is also decreased in various embodiments. Furthermore, the mask-window induced localization in particular embodiments also further reduces computational effort by excluding unnecessary connections between non-target cells. The performance of various embodiments of the process are examined in the experiments and results section below.

Experiments and Results

The performance of various embodiments of the process is quantitively evaluated with a focus on accuracy and time efficiency. In this section, the images and test cases used during experiments are described in detail, and the evaluation results are discussed.

Experimental Images and Test Cases

Five images obtained from three node-technologies are used for performance evaluation. Images of 28 nm and 130 nm technologies are collected from two delayered ICs, where three images from different areas of the 28 nm IC are collected with 32 μs/pixel dwell time and 21.7 μm FoV, and one image of the 130 nm IC is collected by the same dwell time with 25.1 μm FoV. The image of 32 nm technology is synthesized with the Synopsys library. The image is large in pixel size and contains 43,907 dopant regions, which simulates the image area that might need to be inspected in practice. The details of these experimental images are presented in Table 1.

TABLE 1

Statistics of Experimental SEM Images

| Technology | 28 nm | | | 32 nm | 130 nm |
|---|---|---|---|---|---|
| Image type | SEM image | | | Synthesized image | SEM image |
| Image pixel size | 2,518 × 2,518 | | | 18,086 × 18,158 | 4,096 × 4,096 |
| # of intact circuit rows | 19 | | | 104 | 8 |
| # of NP dopants* | Loc1 1,178 | Loc2 1,132 | Loc3 1,291 | 43,907 | 195 |
| # of test cases | 30 | 7 | 6 | 5 | 13 |

*Loc1, Loc2, and Loc3 in 28 nm are three different image areas of the active layer.

As mentioned previously, the target cells and their topology are design-specified, the experiments are conducted through the case studies, which are created with two variables that could exist in practice. One variable is the cell topologies, which are designed to validate the usage of mask windows for different cell placements. Another variable is the number of dopant regions, which is designed to investigate the change of running time when increasing the length of the target shape code. The definitions of these variables are presented in Table 2, and the example topologies 1000, 1010, 1015 are shown in FIG. 10.

TABLE 2

Variables Included in Case Studies

Figure 11A:
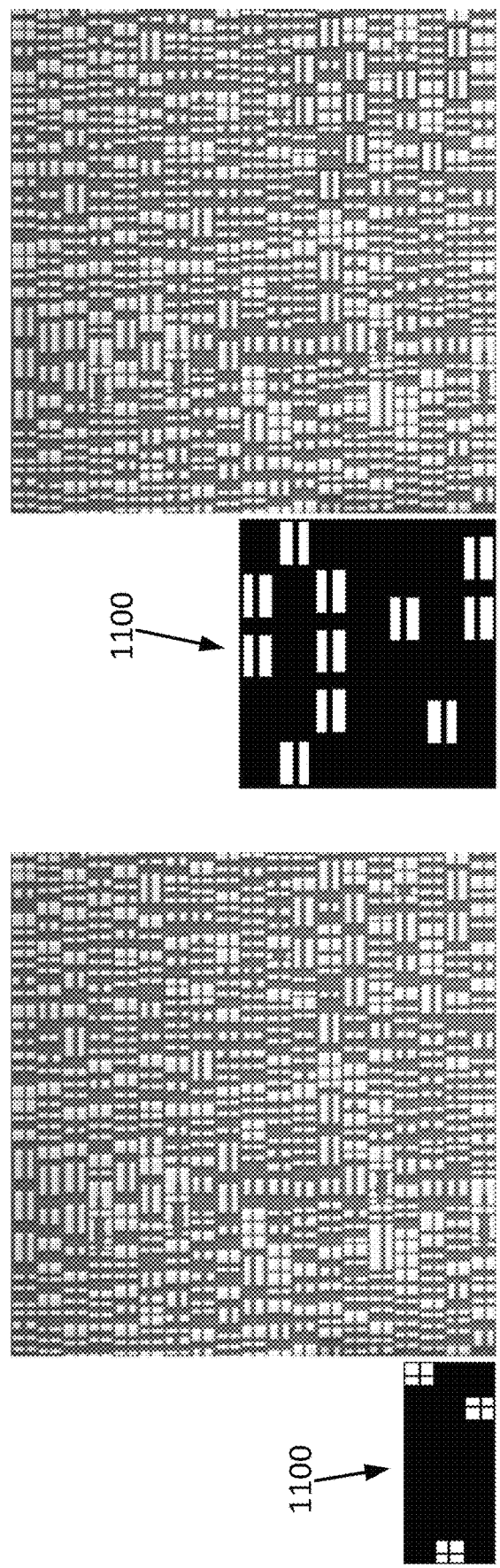
Figure 11B:
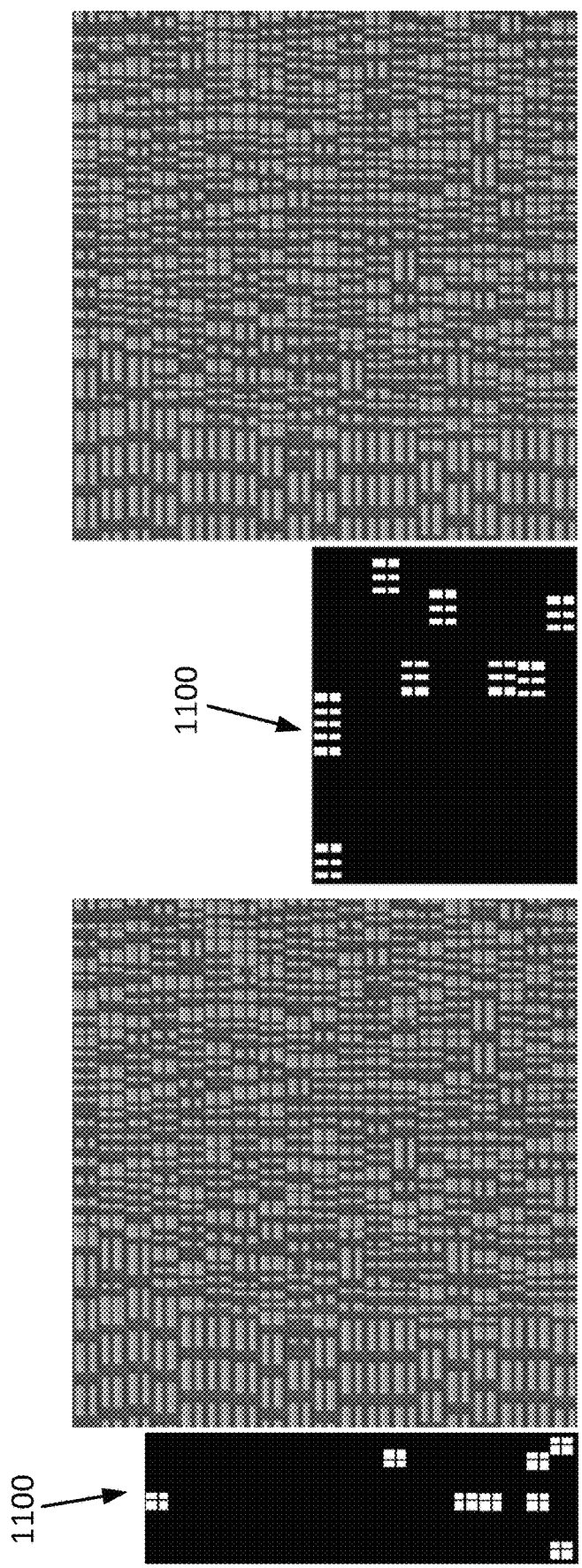

| Variables | Definitions | Example |
|---|---|---|
| Topology in one mask window | Target cells are in one circuit row or target cell is a single cell | FIG. 10 1000 |
| | Left leading cell starts from the first, middle, and last circuit row | FIG. 10 1010 |
| | Target cells are vertically related throughout the image | FIG. 11B left image |
| | Target cells are spread throughout the image | FIG. 10 1015 |
| #of regions in one mask window | 4~180 * Example shows # of regions in FIG. 10 1000, 1010, 1015, respectively | 12, 18, 24 |

Localization Accuracy

Figure 11C:
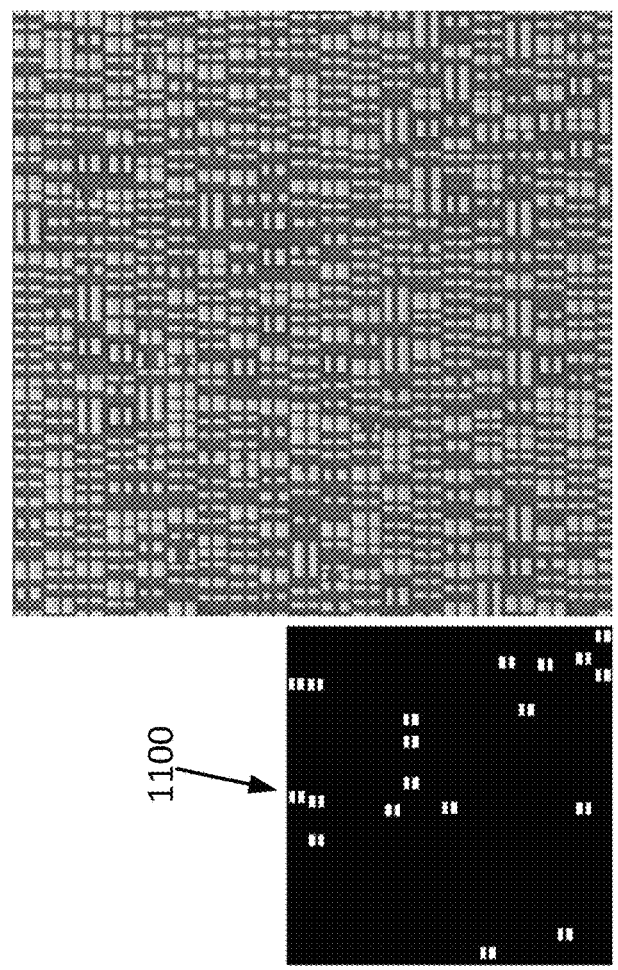
Figure 11C:
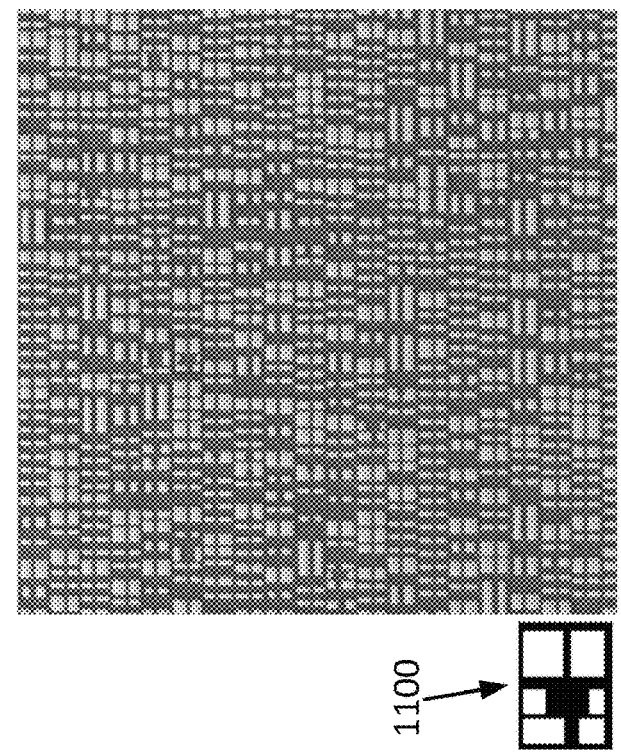
Figure 11D:
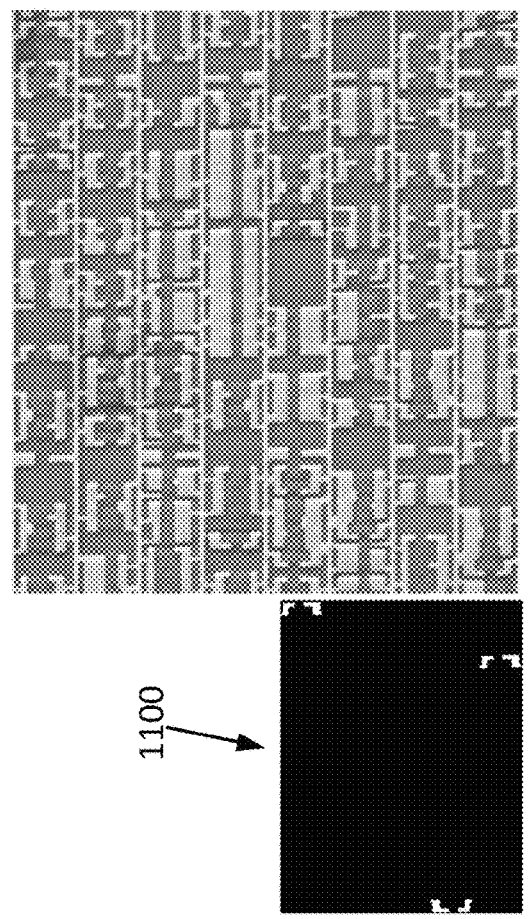
Figure 11D:
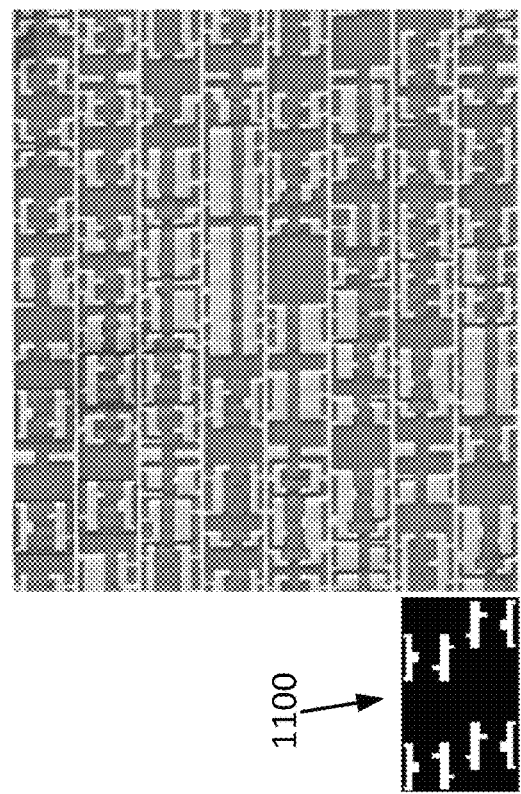
Figure 11E:
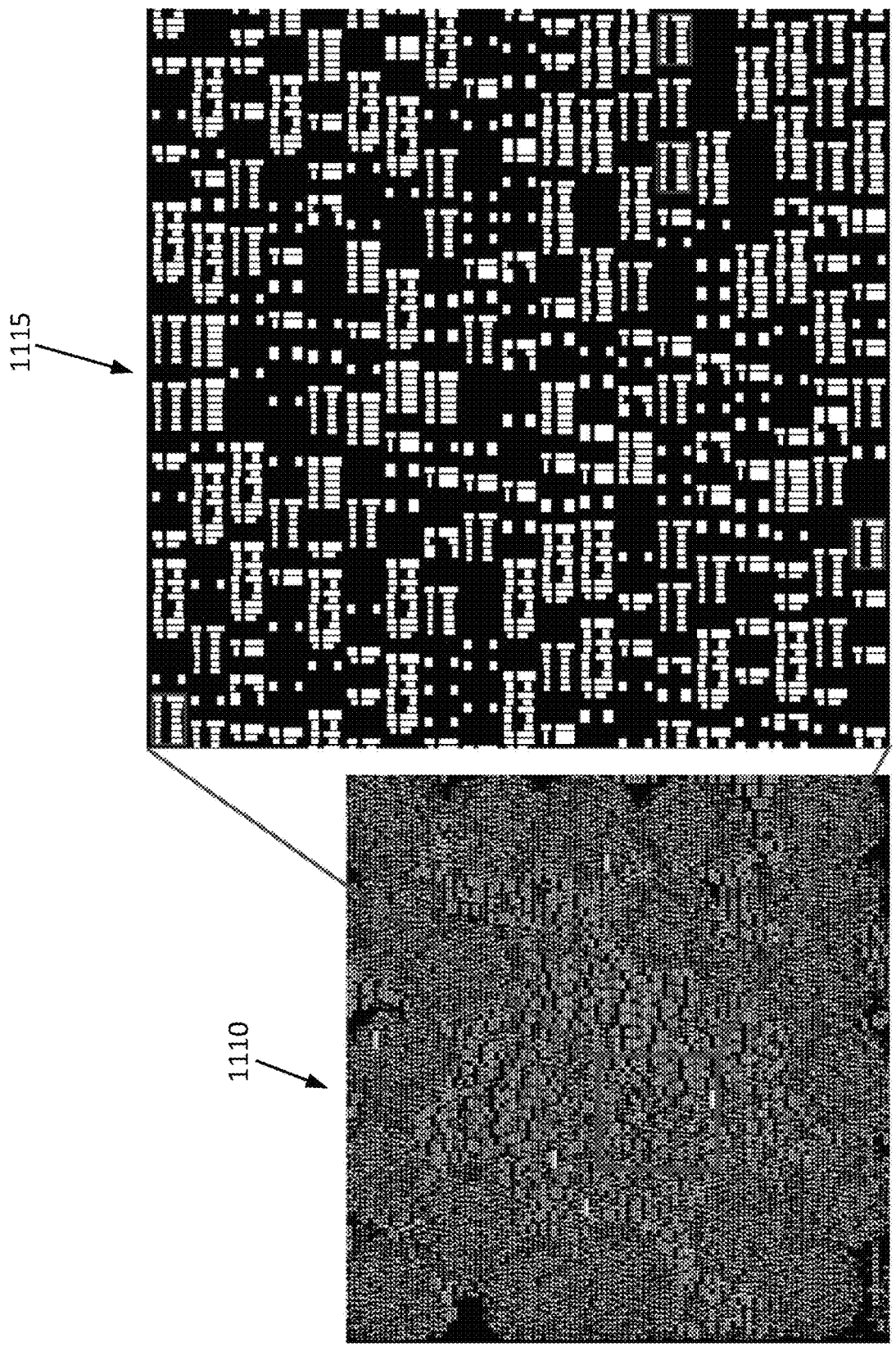

Various embodiments of the process can successfully localize all designed sixty-one test cases, and some of the results are presented in FIGS. 11A-E. FIGS. 11A-C are three SEM image areas of the 28 nm IC and FIG. 11D is the SEM image area of the 130 um IC. All binary templates 1100 in the left side of each example are the mask windows determined from the layout image, and they are rescaled for presentation. FIG. 11E is the image synthesized from the 32 um Synopsys library. The left side image 1110 is the rescaled entire input image, and the right side image 1115 presents the zoomed in image for visualizing the output details. Observations from these figures lead to the following conclusions:

The mask window successfully preserves the 2D topology of target cells with different arrangements of the dopant region. It enables the localization of a single cell, tightly grouped cells, and spread placed cells for both processes.

The adapted 2D string search algorithm used in various embodiments can maintain a good generalizability to IC technology changes, which extends the real-world applications of the process.

As shown in FIG. 11E, when the target cells are selected as the landmark points, various embodiments of the process can locate this specific area from a very large image for further zooming in operation when needed.

Conclusion

Many modifications and other embodiments of the present disclosure set forth herein will come to mind to one skilled in the art to which the present disclosure pertains having the benefit of the teachings presented in the foregoing descriptions and the associated drawings. Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method for using an image of an integrated circuit (IC) comprising a plurality of cells to locate one or more target cells within the IC, the method comprising:
    encoding each footprint for each cell of the plurality of cells found in the image of the IC to transform the image of the IC into a two-dimensional string matrix, wherein (a) each footprint comprises a dopant region, (b) each footprint is encoded with a digit representing a cluster type of the corresponding dopant region, (c) the digit is an element of the two-dimensional string matrix, and (d) the cluster type is determined based at least in part on width and height features of the corresponding dopant region;
    identifying one or more candidate regions of interest within the image of the IC based at least in part on applying a string search algorithm on the two-dimensional string matrix using an encoded target layout cell, wherein the encoded target layout cell is encoded based at least in part on dopant regions of a corresponding target layout cell and cluster types of the dopant regions of the corresponding target layout cell; and
    for each candidate region of interest, identifying at least one target cell of the one or more target cells that is located within the candidate region of interest based at least in part on sliding a mask window over the candidate region of interest while performing matching using match criteria.

2. The computer-implemented method of claim 1, wherein encoding each footprint for each cell of the plurality of cells comprises performing k-means clustering using width and height features of each dopant region found in each footprint for each cell.

3. The computer-implemented method of claim 1, wherein the match criteria comprises a subtraction criteria that includes image subtraction.

4. The computer-implemented method of claim 1 further comprising performing preprocessing on the image prior to encoding each footprint for each cell of the plurality of cells, wherein the preprocessing of the image comprises at least one of aligning the mask window with the image, removing noise from the image, binarizing the image, or removing at least one of voltage lines and ground lines found in the image from the image.

5. The computer-implemented method of claim 4, wherein removing the noise from the image involves:
    applying a Gaussian filter; and
    after applying the Gaussian filter, applying a bilateral filter.

6. The computer-implemented method of claim 4, wherein binarizing the image involves applying Otsu thresholding to the image.

7. An apparatus configured for using an image of an integrated circuit (IC) comprising a plurality of cells to locate one or more target cells within the IC, the apparatus comprising at least one memory and at least one processor, the at least one memory comprising computer program code, wherein the at least one memory and the computer program code are configured to cause the at least one processor to:
    encode each footprint for each cell of the plurality of cells found in the image of the IC to transform the image of the IC into a two-dimensional string matrix, wherein (a) each footprint comprises a dopant region, (b) each footprint is encoded with a digit representing a cluster type of the corresponding dopant region, (c) the digit is an element of the two-dimensional string matrix, and (d) the cluster type is determined based at least in part on width and height features of the corresponding dopant region;
    identify one or more candidate regions of interest within the image of the IC based at least in part on applying a string search algorithm on the two-dimensional string matrix using an encoded target layout cell, wherein the encoded target layout cell is encoded based at least in part on dopant regions of a corresponding target layout cell and cluster types of the dopant regions of the corresponding target layout cell; and
    for each candidate region of interest, identify at least one target cell of the one or more target cells that is located within the candidate region of interest based at least in part on sliding a mask window over the candidate region of interest while performing matching using match criteria.

8. The apparatus of claim 7, wherein encoding each footprint for each cell of the plurality of cells comprises performing k-means clustering using width and height features of each dopant region found in each footprint for each cell.

9. The apparatus of claim 7, wherein the match criteria comprises a subtraction criteria that includes image subtraction.

10. The apparatus of claim 7, wherein the at least one memory and the computer program code are further configured to cause the at least one processor to perform preprocessing on the image prior to encoding each footprint for each cell of the plurality of cells, wherein the preprocessing of the image comprises at least one of aligning the mask window with the image, removing noise from the image, binarizing the image, or removing at least one of voltage lines and ground lines found in the image from the image.

11. The apparatus of claim 10, wherein removing the noise from the image involves:
    applying a Gaussian filter; and
    after applying the Gaussian filter, applying a bilateral filter.

12. The apparatus of claim 10, wherein binarizing the image involves applying Otsu thresholding to the image.

13. A computer program product for using an image of an integrated circuit (IC) comprising a plurality of cells to locate one or more target cells within the IC, the computer program product comprising at least one non-transitory computer-readable storage medium having computer-readable program code portions stored therein, the computer-readable program code portions including executable portions configured to cause a processor to:

encode each footprint for each cell of the plurality of cells found in the image of the IC to transform the image of the IC into a two-dimensional string matrix, wherein (a) each footprint comprises a dopant region, (b) each footprint is encoded with a digit representing a cluster type of the corresponding dopant region, (c) the digit is an element of the two-dimensional string matrix, and (d) the cluster type is determined based at least in part on width and height features of the corresponding dopant region;

identify one or more candidate regions of interest within the image of the IC based at least in part on applying a string search algorithm on the two-dimensional string matrix using an encoded target layout cell, wherein the encoded target layout cell is encoded based at least in part on dopant regions of a corresponding target layout cell and cluster types of the dopant regions of the corresponding target layout cell; and for each candidate region of interest, identify at least one target cell of the one or more target cells that is located within the candidate region of interest based at least in part on sliding a mask window over the candidate region of interest while performing matching using match criteria.

14. The computer program product of claim 13, wherein encoding each footprint for each cell of the plurality of cells comprises performing k-means clustering using width and height features of each dopant region found in each footprint for each cell.

15. The computer program product of claim 13, wherein the match criteria comprises a subtraction criteria that includes image subtraction.

16. The computer program product of claim 13, wherein the executable portions are further configured to cause the processor to perform preprocessing on the image prior to encoding each footprint for each cell of the plurality of cells, wherein the preprocessing of the image comprises at least one of aligning the mask window with the image, removing noise from the image, binarizing the image, or removing at least one of voltage lines and ground lines found in the image from the image.

17. The computer program product of claim 16, wherein removing the noise from the image involves:
applying a Gaussian filter; and
after applying the Gaussian filter, applying a bilateral filter.

18. The computer program product of claim 16, wherein binarizing the image involves applying Otsu thresholding to the image.

* * * * *